(12) United States Patent
Kato et al.

(10) Patent No.: US 7,554,892 B2
(45) Date of Patent: Jun. 30, 2009

(54) METHOD FOR RECORDING DATA IN OPTICAL RECORDING MEDIUM, AN APPARATUS FOR RECORDING DATA IN OPTICAL RECORDING MEDIUM AND OPTICAL RECORDING MEDIUM

(75) Inventors: Tatsuya Kato, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 62 days.

(21) Appl. No.: 10/514,611

(22) PCT Filed: May 19, 2003

(86) PCT No.: PCT/JP03/06198

§ 371 (c)(1),
(2), (4) Date: Nov. 16, 2004

(87) PCT Pub. No.: WO03/098611

PCT Pub. Date: Nov. 27, 2003

(65) Prior Publication Data

US 2005/0213477 A1    Sep. 29, 2005

(30) Foreign Application Priority Data

May 17, 2002   (JP)   ............................. 2002-143477

(51) Int. Cl.
*G11B 7/00*   (2006.01)
(52) U.S. Cl. .................................... 369/59.11
(58) Field of Classification Search .............. None
See application file for complete search history.

(56) References Cited

U.S. PATENT DOCUMENTS 5,487,059 A   1/1996   Saito et al.   .................. 369/116

(Continued)

FOREIGN PATENT DOCUMENTS

JP   62204442   9/1987

(Continued)

OTHER PUBLICATIONS

Japanese Office Action dated Oct. 21, 2008, related to corresponding Japanese Application No. 2006-24824, 3 pages.

*Primary Examiner*—Joseph Feild
*Assistant Examiner*—Joseph Haley
(74) *Attorney, Agent, or Firm*—Seed IP Law Group PLLC

(57) ABSTRACT

It is an object of the present invention to provide a method for recording data in an optical recording medium which can record data in a write-once type optical recording medium at a high linear recording velocity using a laser beam whose recording power is set low. The method for recording data in an optical recording medium according to the present invention is constituted so that data are recorded by a laser beam whose power is modulated in accordance with a pulse train pattern onto an optical recording medium including a substrate, a first recording layer, a second recording layer and a light transmission layer to form a recording mark wherein a recording pulse is divided into (n−1) divided pulses and the power of the laser beam is set to a recording power Pw at the peak of each of the divided pulses and set to a first bottom power Pb1 and the levels of the recording power Pw and the first bottom power Pb1 are determined so that a ratio Pb1/Pw of the first bottom power Pb1 to the recording power Pw falls within a range of 0.1 to 0.5. When the power of a laser beam is modulated using such a pulse train pattern to record data in an optical recording medium, the heating of a recording layer by the laser beam having the recording power Pw can be augmented by the laser beam having the first bottom power Pb1 and therefore, even in the case where data are to be recorded in an optical recording medium at a high linear recording velocity, it is possible to record data in the optical recording medium at a high linear recording velocity using a semiconductor laser having a low output.

42 Claims, 9 Drawing Sheets

U.S. PATENT DOCUMENTS

| | | | | |
|---|---|---|---|---|
| 5,825,742 A | * | 10/1998 | Tanaka et al. | 369/59.11 |
| 5,848,043 A | * | 12/1998 | Takada et al. | 369/53.3 |
| 5,978,351 A | * | 11/1999 | Spruit et al. | 369/275.3 |
| 6,132,932 A | * | 10/2000 | Miyamoto et al. | 430/270.13 |
| 6,600,709 B2 | * | 7/2003 | Dekker | 369/53.26 |

FOREIGN PATENT DOCUMENTS

| | | | |
|---|---|---|---|
| JP | 04281217 A | | 10/1992 |
| JP | 06203383 | | 7/1994 |
| JP | 2000187842 | | 7/2000 |
| JP | 2002008269 A | | 1/2002 |
| JP | 2002133712 A | | 5/2002 |
| JP | WO02/065462 | * | 8/2002 |

* cited by examiner (a)

(b)

(a)

(b)

(a)

(b)

METHOD FOR RECORDING DATA IN OPTICAL RECORDING MEDIUM, AN APPARATUS FOR RECORDING DATA IN OPTICAL RECORDING MEDIUM AND OPTICAL RECORDING MEDIUM

BACKGROUND OF THE INVENTION

1. Field of the Invention

The present invention relates to a method for recording data in an optical recording medium, an apparatus for recording data in an optical recording medium and an optical recording medium, and particularly, to a method for recording data in a write-once type optical recording medium, an apparatus for recording data in a write-once type optical recording medium, and a write-once type optical recording medium.

2. Description of the Related Art

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using pre-pits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, or chemical change and physical change of the organic dye.

Further, there is known a write-once type recording medium formed by laminating two recording layers (See Japanese Patent Application Laid Open No. 62-204442, for example) and in this optical recording medium, data are recorded therein by projecting a laser beam thereon and mixing elements contained in the two recording layers to form a region whose optical characteristic differs from those of regions therearound.

In this specification, in the case where an optical recording medium includes a recording layer containing an organic dye, a region in which an organic dye chemically changes or chemically and physically changes upon being irradiated with a laser beam is referred to as "a recording mark" and in the case where an optical recording medium includes two recording layers each containing an inorganic element as a primary component, a region in which the inorganic elements contained in the two recording layers as a primary component are mixed upon being irradiated with a laser beam is referred to as "a recording mark".

An optimum method for modulating the power of a laser beam projected onto an optical recording medium for recording data therein is generally called "a pulse train pattern" or "recording strategy".

FIG. 9 is a diagram showing a typical pulse train pattern used for recording data in a CD-R including a recording layer containing an organic dye and shows a pulse train pattern for recording 3 T to 11 T signals in the EFM Modulation Code.

As shown in FIG. 9, in the case where data are to be recorded in a CD-R, a recording pulse having a width corresponding to the length of a recording mark M to be formed is generally employed (See Japanese Patent Application Laid Open No. 2000-187842, for example).

More specifically, the power of a laser beam is fixed to a bottom power Pb when the laser beam is projected onto a blank region in which no recording mark M is formed and fixed to a recording power Pw when the laser beam is projected onto a region in which a recording mark M is to be formed. As a result, an organic dye contained in a recording layer is decomposed or degraded at a region in which a recording mark M is to be formed and the region is physically deformed, thereby forming a recording mark M therein. Here, the linear recording velocity is about 1.2 m/sec at a 1× linear recording velocity of a CD-R.

FIG. 10 is a diagram showing a typical pulse train pattern used for recording data in a DVD-R including a recording layer containing an organic dye and shows a pulse train pattern for recording a 7 T signal in the 8/16 Modulation Code.

Since data are recorded in a DVD-R at a higher linear recording velocity than when recording data in a CD-R, unlike the case of recording data in a CD-R, it is difficult to form a recording mark having a good shape using a recording pulse having a width corresponding to the length of the recording mark M to be formed.

Therefore, data are recorded in a DVD-R using a pulse train in which, as shown in FIG. 11, the recording pulse is divided into a number of divided pulses corresponding to the length of the recording mark M to be formed.

More specifically, in the case of recording an nT signal where n is an integer equal to or larger than 3 and equal to or smaller than 11 or 14 in the 8/16 Modulation Code, (n−2) divided pulses are employed and the power of the laser beam is set to a recording power Pw at the peak of each of the divided pulses and set to a bottom power Pb at the other portions of the pulse. In this specification, the thus constituted pulse train pattern is referred to as "a basic pulse train pattern". Here, the linear recording velocity is about 3.5 m/sec at a 1× linear recording velocity of a DVD-R.

As shown in FIG. 10, in the basic pulse train pattern, the level of a bottom power Pb is set equal to a reproducing power Pr used for reproducing data or close thereto.

On the other hand, a next-generation type optical recording medium that offers improved recording density and has an extremely high data transfer rate has been recently proposed.

In such a next-generation type optical recording medium, in order to achieve an extremely high data transfer rate, it is required to record data at a higher linear recording velocity than that in a conventional optical recording medium, and since the recording power Pw necessary for forming a recording mark is generally substantially proportional to the square root of the linear recording velocity in a write-once optical recording medium, it is necessary to employ a semiconductor laser having a high output for recording data in a next-generation optical recording medium.

Further, in the next-generation type optical recording medium, the achievement of increased recording capacity and extremely high data transfer rate inevitably requires the diameter of the laser beam spot used to record and reproduce data to be reduced to a very small size.

In order to reduce the laser beam spot diameter, the numerical aperture of the objective lens for condensing the laser beam needs to be increased to 0.7 or more, for example, to about 0.85, and the wavelength of the laser beam needs to be shortened to 450 nm or less, for example, to about 400 nm.

However, the output of a semiconductor laser emitting a laser beam having a wavelength equal to or shorter than 450 nm is smaller than that of a semiconductor laser emitting a laser beam having a wavelength of 780 nm for a CD and that of a semiconductor laser emitting a laser beam having a wavelength of 650 nm for a DVD, and a semiconductor laser that emits a laser beam having a wavelength equal to or shorter than 450 nm and has a high output is expensive.

Therefore, it is difficult to record data in a next-generation type optical recording medium using the basic pulse train pattern at a high data transfer rate and this problem is particularly serious when recording data at a linear recording velocity equal to or higher than 5 m/sec.

BRIEF SUMMARY OF THE INVENTION

It is therefore an object of the present invention to provide a method for recording data in an optical recording medium which can record data in a write-once type optical recording medium at a high linear recording velocity.

It is another object of the present invention to provide a method for recording data in an optical recording medium which can record data in a write-once type optical recording medium using a laser beam whose recording power is set low.

It is a further object of the present invention to provide a method for recording data in an optical recording medium which can record data in a write-once type optical recording medium at a high linear recording velocity using an inexpensive semiconductor laser having a low output.

It is a further object of the present invention to provide a method for recording data in an optical recording medium which can record data in a write-once type optical recording medium including two or more recording layers at a high linear recording velocity.

It is a further object of the present invention to provide an apparatus for recording data in an optical recording medium which can record data in a write-once type optical recording medium at a high linear recording velocity.

It is a further object of the present invention to provide an apparatus for recording data in an optical recording medium which can record data in a write-once type optical recording medium using a laser beam whose recording power is set low.

It is a further object of the present invention to provide an apparatus for recording data in an optical recording medium which can record data in a write-once type optical recording medium at a high linear recording velocity using an inexpensive semiconductor laser having a low output.

It is a further object of the present invention to provide an apparatus for recording data in an optical recording medium which can record data in a write-once type optical recording medium including two or more recording layers at a high linear recording velocity.

It is a further object of the present invention to provide an optical recording medium in which data can be recorded at a high linear recording velocity.

It is a further object of the present invention to provide an optical recording medium in which data can be recorded using a laser beam whose recording power is set low.

It is a further object of the present invention to provide an optical recording medium in which data can be recorded at a high linear recording velocity using an inexpensive semiconductor laser having a low output.

It is a further object of the present invention to provide an optical recording medium including two or more recording layers in which data can be recorded at a high linear recording velocity.

The inventors of the present invention vigorously pursued a study for accomplishing the above objects and, as a result, made the discovery that when the ratio $Pb1/Pw$ of a first bottom power $Pb1$ to a recording power $Pw$ was set to 0.1 to 0.5, the heating of a recording layer by the laser beam having the recording power $Pw$ was augmented by the laser beam having the first bottom power $Pb1$ and it was possible to record data in an optical recording medium with a lower recording power even in the case where data were to be recorded at a high linear recording velocity.

Therefore, the above objects of the present invention can be accomplished by a method for recording data in an optical recording medium wherein data are recorded in a write-once type optical recording medium comprising a substrate and at least one recording layer formed on the substrate by projecting a laser beam whose power is modulated by a pulse train pattern including at least a pulse whose level is set to a level corresponding to a recording power and a pulse whose level is set to a level corresponding to a first bottom power onto the at least one recording layer and forming at least two recording marks in the at least one recording layer, the method for recording data in an optical recording medium comprising a step of setting a ratio $Pb1/Pw$ of a first bottom power $Pb1$ to a recording power $Pw$ to 0.1 to 0.5.

In this specification, in the case where an optical recording medium includes a recording layer containing an organic dye, a region in which the organic dye chemically changes or chemically and physically changes upon being irradiated with a laser beam is referred to as a "recording mark" and in the case where an optical recording medium includes two recording layers each containing an inorganic element as a primary component, a region in which the inorganic elements contained in the two recording layers as a primary component are mixed upon being irradiated with a laser beam is referred to as a "recording mark".

According to the present invention, since the ratio $Pb1/Pw$ of the first bottom power $Pb1$ to the recording power $Pw$ is set to 0.1 to 0.5, the heating of a recording layer by the laser beam having the recording power $Pw$ can be augmented by the laser beam having the first bottom power $Pb1$ and it is therefore possible to record data in an optical recording medium with a lower recording power even in the case where data are to be recorded at a high linear recording velocity.

Further, according to the present invention, since the ratio $Pb1/Pw$ of the first bottom power $Pb1$ to the recording power $Pw$ is set to 0.1 to 0.5, the heating of a recording layer by the laser beam having the recording power $Pw$ can be augmented by the laser beam having the first bottom power $Pb1$ and it is therefore possible to record data in an optical recording medium at a high linear recording velocity using an inexpensive semiconductor laser having a low output.

In a preferred aspect of the present invention, data are recorded at a linear recording velocity equal to or higher than 5 m/sec.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a further preferred aspect of the present invention, the second recording layer is formed so as to be in contact with the first recording layer.

In a preferred aspect of the present invention, the at least two recording marks are formed by setting a ratio of the shortest blank region interval to a linear recording velocity to equal to or smaller than 40 nsec.

In a preferred aspect of the present invention, data are recorded at a linear recording velocity equal to or higher than 10 m/sec by setting the ratio Pb1/Pw of the first bottom power Pb1 to the recording power Pw to 0.2 to 0.5.

In a further preferred aspect of the present invention, the at least two recording marks are formed by setting a ratio of the shortest blank region interval to a linear recording velocity equal to or smaller than 20 nsec.

In a further preferred aspect of the present invention, the ratio Pb1/Pw of the first bottom power Pb1 to the recording power Pw is set to 0.3 to 0.45.

In a preferred aspect of the present invention, the pulse whose level is set to a level corresponding to the recording level is constituted by divided pulses of a number corresponding to a length of the recording mark.

In a further preferred aspect of the present invention, the power of the laser beam is modulated in accordance with a pulse train pattern including a pulse whose level to set to a level corresponding to a second bottom power lower than the first bottom power after the pulse whose level is set to a level corresponding to the recording level.

In a preferred aspect of the present invention, the first bottom power and the recording power are set so that AH is larger than AL, where AL is a ratio of the first bottom power to the recording power when data are to be recorded at a first linear recording velocity and AH is a ratio of the first bottom power to the recording power when data are to be recorded at a second linear recording velocity higher than the first linear recording velocity.

In a further preferred aspect of the present invention, the first bottom power and the recording power are set so that AH is larger than 1.5 * AL and smaller than 5.0 * AL.

In a further preferred aspect of the present invention, the first bottom power and the recording power are set so that AH is larger than 2.5 * AL and smaller than 4.0 * AL.

In a further preferred aspect of the present invention, the first linear recording velocity is set equal to or higher than 5 m/sec and the second linear recording velocity is set equal to or higher than 10 m/sec.

In a preferred aspect of the present invention, data are recorded in the optical recording medium by projecting a laser beam having a wavelength equal to or shorter than 450 nm thereonto.

In a preferred aspect of the present invention, data are recorded in the optical recording medium by employing an objective lens and a laser beam whose numerical aperture NA and wavelength $\lambda$ satisfy $\lambda/NA \leq 640$ nm, and projecting the laser be/m onto the optical recording medium via the objective lens.

The above objects of the present invention can be also accomplished by an apparatus for recording data in an optical recording medium, which comprises a laser beam projecting means for projecting a laser beam whose power is modulated by a pulse train pattern including at least a pulse whose level is set to a level corresponding to a recording power and a pulse whose level is set to a level corresponding to a first bottom power onto a write-once type recording medium comprising a substrate and at least one recording layer formed on the substrate, the laser beam projecting means being constituted so as to modulate the power of the laser beam in accordance with the pulse train pattern in which a ratio Pb1/Pw of the first bottom power Pb1 to the recording power Pw is set to 0.1 to 0.5.

In a preferred aspect of the present invention, data are recorded at a linear recording velocity equal to or higher than 5 m/sec.

In a preferred aspect of the present invention, a ratio of the shortest blank region interval to a linear recording velocity is set equal to or smaller than 40 nsec.

In a preferred aspect of the present invention, data are recorded at a linear recording velocity equal to or higher than 10 m/sec by setting the ratio Pb1/Pw of the first bottom power Pb1 to the recording power Pw to 0.2 to 0.5.

In a further preferred aspect of the present invention, the ratio of the shortest blank region interval to a linear recording velocity is set equal to or smaller than 20 nsec.

In a further preferred aspect of the present invention, the ratio Pb1/Pw of the first bottom power Pb1 to the recording power Pw is set to 0.3 to 0.45.

In a preferred aspect of the present invention, the pulse whose level is set to a level corresponding to the recording level is constituted by divided pulses of a number corresponding to a length of the recording mark.

In a further preferred aspect of the present invention, the power of the laser beam is modulated in accordance with a pulse train pattern including a pulse whose level to set to a level corresponding to a second bottom power lower than the first bottom power after the pulse whose level is set to a level corresponding to the recording level.

In a preferred aspect of the present invention, the first bottom power and the recording power are set so that AH is larger than AL where AL is a ratio of the first bottom power to the recording power when data are to be recorded at a first linear recording velocity and AH is a ratio of the first bottom power to the recording power when data are to be recorded at a second linear recording velocity higher than the first linear recording velocity.

In a further preferred aspect of the present invention, the first bottom power and the recording power are set so that AH is larger than 1.5 * AL and smaller than 5.0 * AL.

In a further preferred aspect of the present invention, the first bottom power and the recording power are set so that AH is larger than 2.5 * AL and smaller than 4.0 * AL.

In a further preferred aspect of the present invention, the first linear recording velocity is set equal to or higher than 5 m/sec and the second linear recording velocity is set equal to or higher than 10 m/sec.

The above objects of the present invention can be also accomplished by a write-once type optical recording medium comprising a substrate and at least one recording layer formed on the substrate and constituted so that data are recorded therein by projecting a laser beam whose power is modulated by a pulse train pattern including at least a pulse whose level is set to a level corresponding to a recording power and a pulse whose level is set to a level corresponding to a first bottom power thereonto and forming at least two recording marks in the at least one recording layer, the optical recording medium being recorded with data for setting recording conditions required for modulating the power of the laser beam in accordance with the pulse train pattern in which a ratio Pb1/Pw of the first bottom power Pb1 to the recording power Pw is set to 0.1 to 0.5.

According to the present invention, since the optical recording medium is recorded with data for setting recording conditions required for modulating the power of the laser beam in accordance with the pulse train pattern in which a ratio Pb1/Pw of the first bottom power Pb1 to the recording power Pw is set to 0.1 to 0.5, when data are to be recorded in the optical recording medium by projecting the laser beam thereonto, data can be recorded at a high linear recording velocity by setting the recording power Pw of the laser beam to a low value based on the data for setting recording conditions.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a further preferred aspect of the present invention, the second recording layer is formed so as to be in contact with the first recording layer.

In the present invention, it is preferable for the first recording layer and the second recording layer to contain different elements as a primary component and for each of them to contain an element selected from a group consisting of Al, Si, Ge, C, Sn, Au, Zn, Cu, B, Mg, Ti, Mn, Fe, Ga, Zr, Ag and Pt as a primary component.

In a preferred aspect of the present invention, the first recording layer contains an element selected from a group consisting of Si, Ge, Sn, Mg, In, Zn, Bi and Al as a primary component, and the second recording layer contains Cu as a primary component.

In the present invention, in the case where the first recording layer contains an element selected from a group consisting of Si, Ge, Sn, Mg, In, Zn, Bi and Al as a primary component, and the second recording layer contains Cu as a primary component, the optical recording medium may include one or more recording layers containing an element selected from the group consisting of Si, Ge, Sn, Mg, In, Zn, Bi and Al as a primary component or one or more recording layers containing Cu as a primary element, in addition to the first recording layer and the second recording layer.

In the present invention, it is more preferable for the first recording layer to contain an element selected from a group consisting of Ge, Si, Mg, Al and Sn as a primary component.

In the present invention, in the case where the first recording layer contains an element selected from a group consisting of Si, Ge, Sn, Mg, In, Zn, Bi and Al as a primary component, and the second recording layer contains Cu as a primary component, it is preferable that at least one kind of an element selected from the group consisting of Al, Si, Zn, Mg, Au, Sn, Ge, Ag, P, Cr, Fe and Ti is added to the second recording layer and it is more preferable that at least one kind of an element selected from the group consisting of Al, Zn, Sn and Au is added to the second recording layer.

In another preferred aspect of the present invention, the first recording layer contains an element selected from a group consisting of Si, Ge, C, Sn, Zn and Cu as a primary component and the second recording layer contains Al as a primary component.

In the present invention in the case where the first recording layer contains an element selected from a group consisting of Si, Ge, C, Sn, Zn and Cu as a primary component and the second recording layer contains Al as a primary component, the optical recording medium may include one or more recording layer containing an element selected from the group consisting of Si, Ge, C, Sn, Zn and Cu as a primary component or one or more recording layer containing Al as a primary component, in addition to the first recording layer and the second recording layer.

In the present invention in the case where the first recording layer contains an element selected from a group consisting of Si, Ge, C, Sn, Zn and Cu as a primary component and the second recording layer contains Al as a primary component, it is preferable that at least one kind of an element selected from the group consisting of Mg, Au, Ti and Cu is added to the second recording layer.

In the present invention in the case where the first recording layer contains an element selected from a group consisting of Si, Ge, C, Sn, Zn and Cu as a primary component and the second recording layer contains Al as a primary component, the first recording layer and the second recording layer are preferably formed so that the total thickness thereof is 2 nm to 40 nm, more preferably, 2 nm to 30 nm, most preferably, 2 nm to 20 nm.

In a further preferred aspect of the present invention, the first recording layer contains an element selected from a group consisting of Si, Ge, C and Al as a primary component, the second recording layer contains Zn as a primary component and the first recording layer and the second recording layer are formed so that the total thickness thereof is equal to or thinner than 30 nm.

In the present invention, in the case where the first recording layer contains an element selected from a group consisting of Si, Ge, C and Al as a primary component and the second recording layer contains Zn as a primary component, the optical recording medium may include one or more recording layer containing an element selected from the group consisting of Si, Ge, C and Al as a primary component or one or more recording layer containing Zn as a primary component.

In the present invention, in the case where the first recording layer contains an element selected from a group consisting of Si, Ge, C and Al as a primary component and the second recording layer contains Zn as a primary component, it is preferable for the first recording layer to contain an element selected from a group consisting of Si, Ge and C as a primary component.

In the present invention, in the case where the first recording layer contains an element selected from a group consisting of Si, Ge, C and Al as a primary component and the second recording layer contains Zn as a primary component, the first recording layer and the second recording layer are preferably formed so that the total thickness thereof is 2 nm to 30 nm, more preferably, 2 nm to 24 nm, most preferably, 2 nm to 12 nm.

In the present invention, in the case where the first recording layer contains an element selected from a group consisting of Si, Ge, C and Al as a primary component and the second recording layer contains Zn as a primary component, it is preferable that at least one kind of an element selected from the group consisting of Mg, Cu and Al I added to the second recording layer.

In a preferred aspect of the present invention, the light transmission layer is formed so as to have a thickness of 10 nm to 300 nm.

The above and other objects and features of the present invention will become apparent from the following description made with reference to the accompanying drawings.

is a schematic enlarged cross-sectional view showing an optical recording medium after data have been recorded therein.

Figure 3:
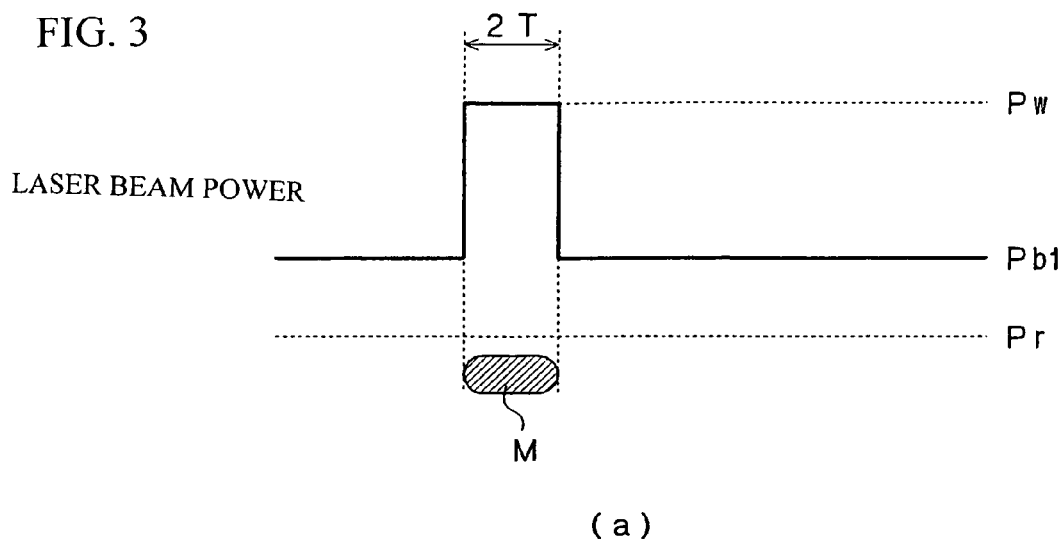
Figure 3:
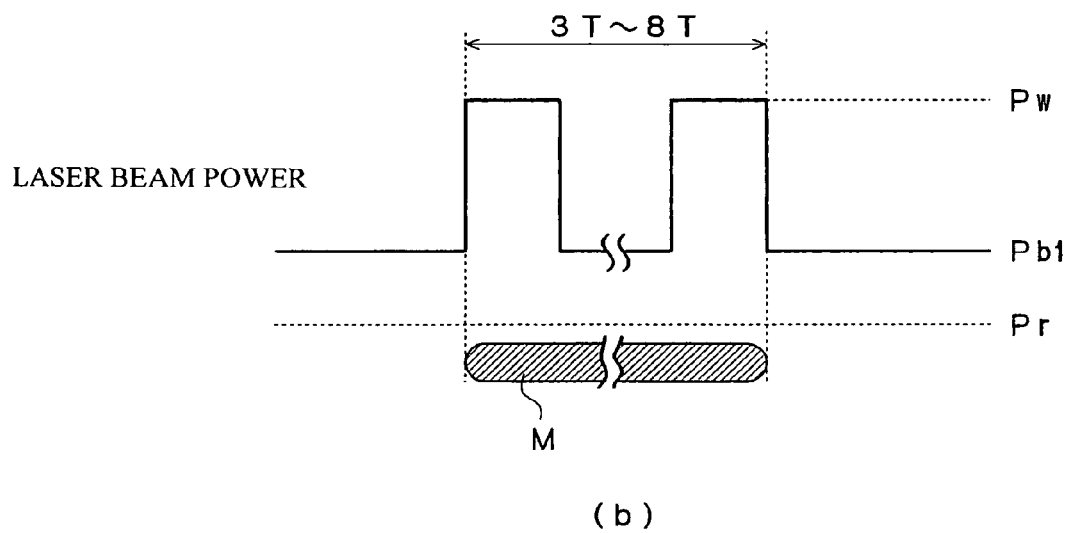

FIG. 3 is a set of diagrams showing a first pulse train pattern in the case where the 1.7RLL Modulation Code is employed, wherein FIG. 3(a) shows a pulse train pattern when a 2 T signal is recorded and FIG. 3(b) shows a pulse train pattern when one of a 3 T signal to an 8 T signal is recorded.

Figure 4:
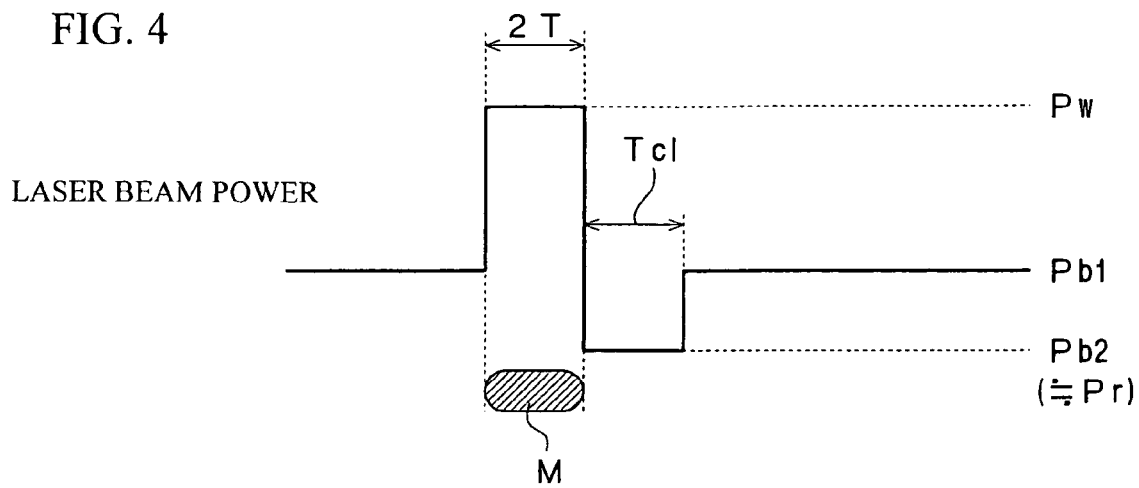
Figure 4:
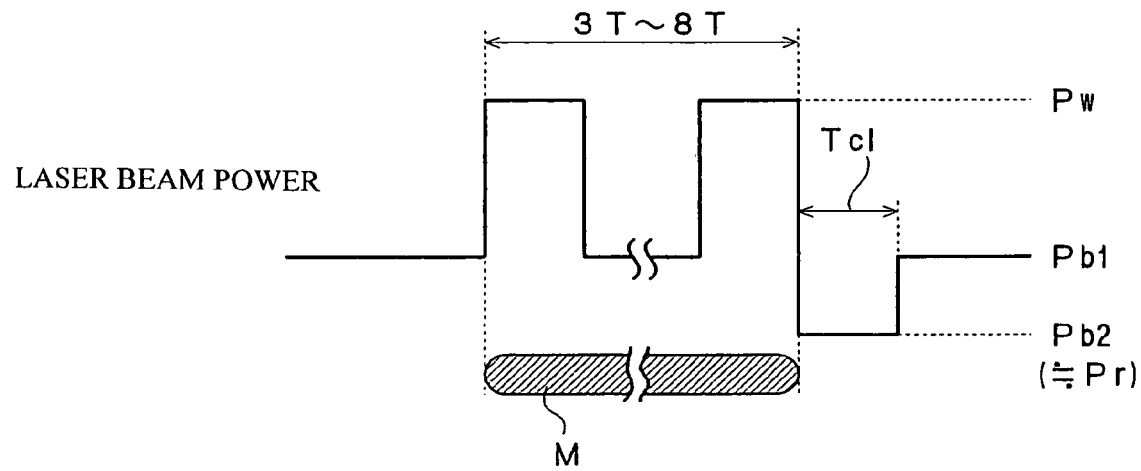

FIG. 4 is a set of diagrams showing a first pulse train pattern in the case where the 1.7RLL Modulation Code is employed, wherein FIG. 4(a) shows a pulse train pattern when a 2 T signal is recorded and FIG. 4(b) shows a pulse train pattern when one of a 3 T signal to an 8 T signal is recorded.

Figure 5:
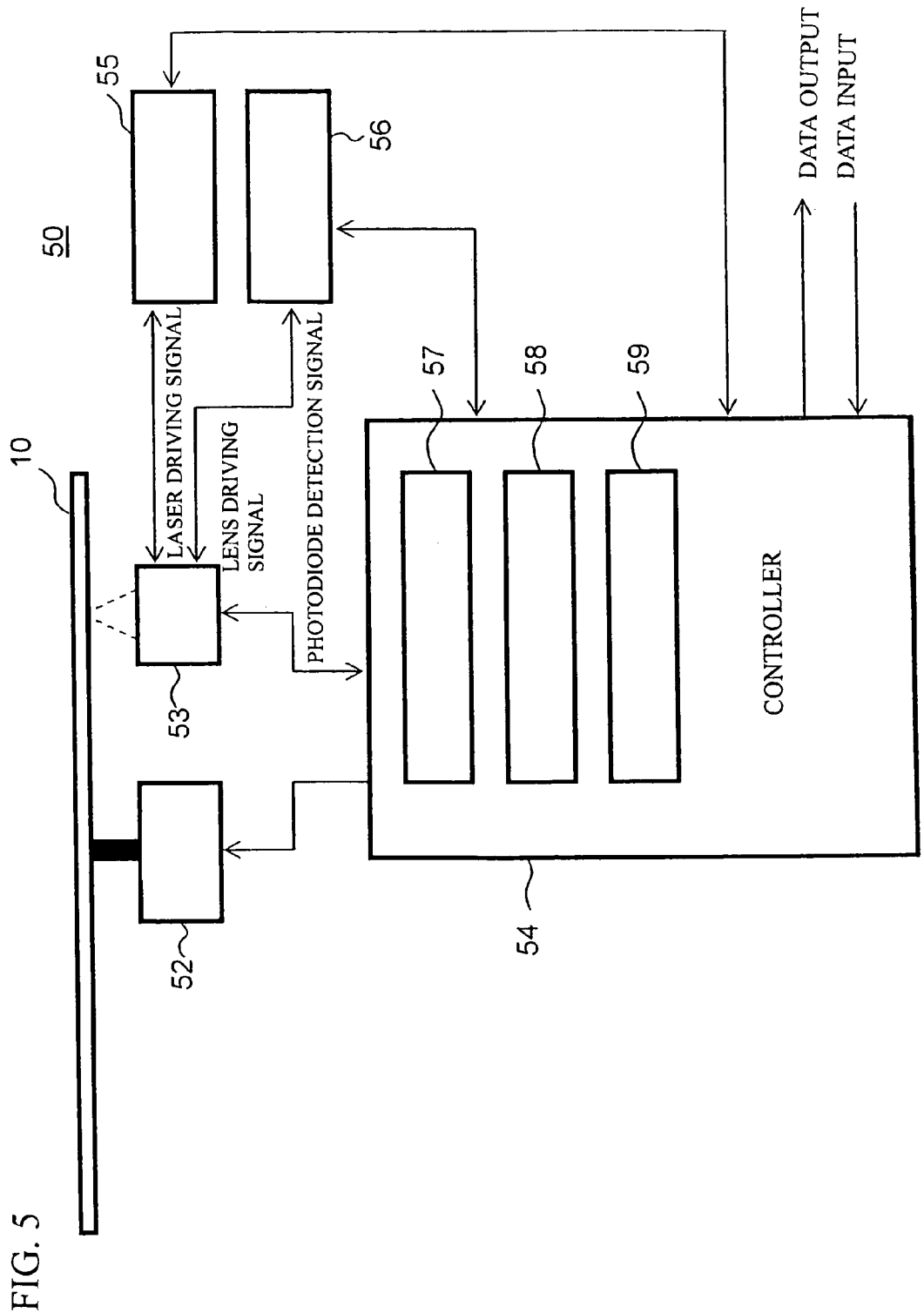

FIG. 5 is a block diagram showing a data recording and reproducing apparatus that is a preferred embodiment of the present invention.

Figure 6:
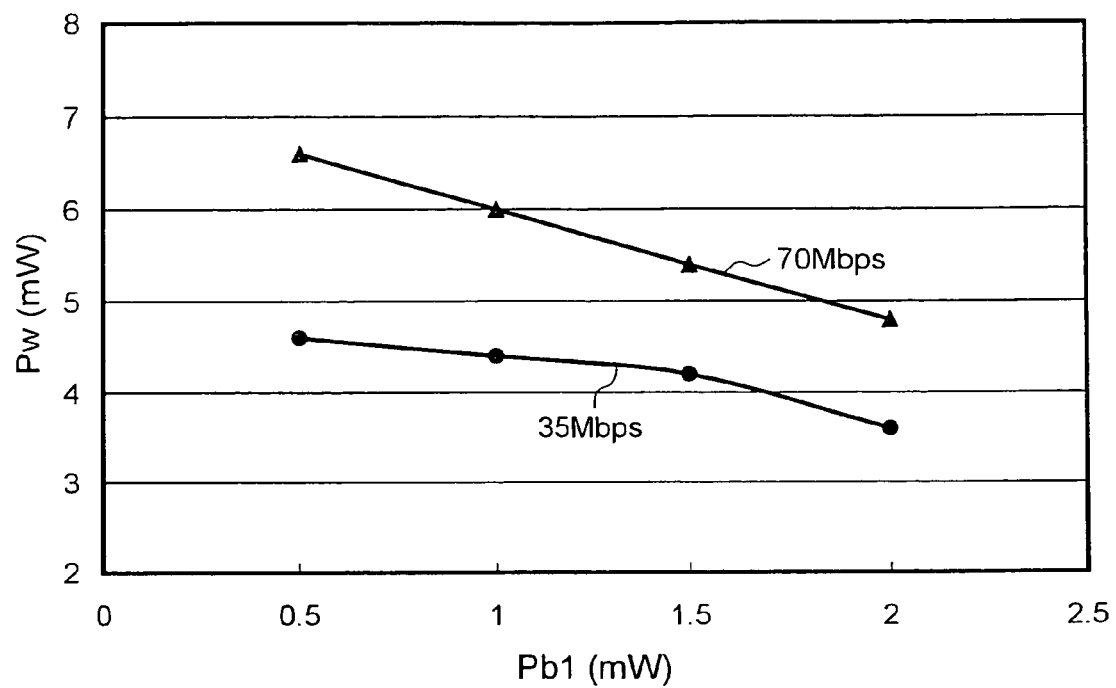

FIG. 6 is a graph showing the relationship between optimum recording power Pw and first bottom power Pb1 in the case where data were recorded at a data transfer rate of about 35 Mbps by modulating the power of a laser beam using a first pulse train pattern having a pulse whose level was set to a level corresponding to the optimum recording power Pw, where the optimum recording power Pw was defined as the recording power Pw when jitter was minimum, and the relationship between optimum recording power Pw and first bottom power Pb1 in the case where data were recorded at a data transfer rate of about 35 Mbps by modulating the power of a laser beam using a second pulse train pattern having a pulse whose level was set to a level corresponding to the optimum recording power Pw.

Figure 7:
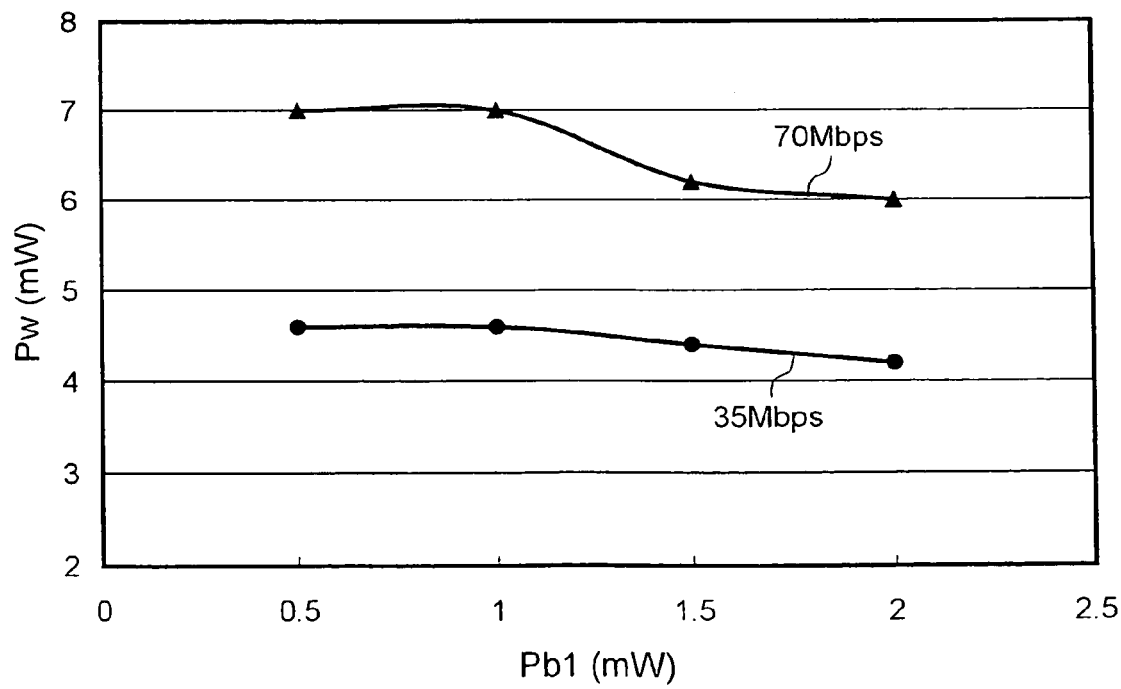

FIG. 7 is a graph showing the relationship between optimum recording power Pw and first bottom power Pb1 in the case where data were recorded at a data transfer rate of about 70 Mbps by modulating the power of a laser beam using a first pulse train pattern having a pulse whose level was set to a level corresponding to the optimum recording power Pw, where the optimum recording power Pw was defined as the recording power Pw when jitter was minimum, and the relationship between optimum recording power Pw and first bottom power Pb1 in the case where data were recorded at a data transfer rate of about 70 Mbps by modulating the power of a laser beam using a second pulse train pattern having a pulse whose level was set to a level corresponding to the optimum recording power Pw.

Figure 8:
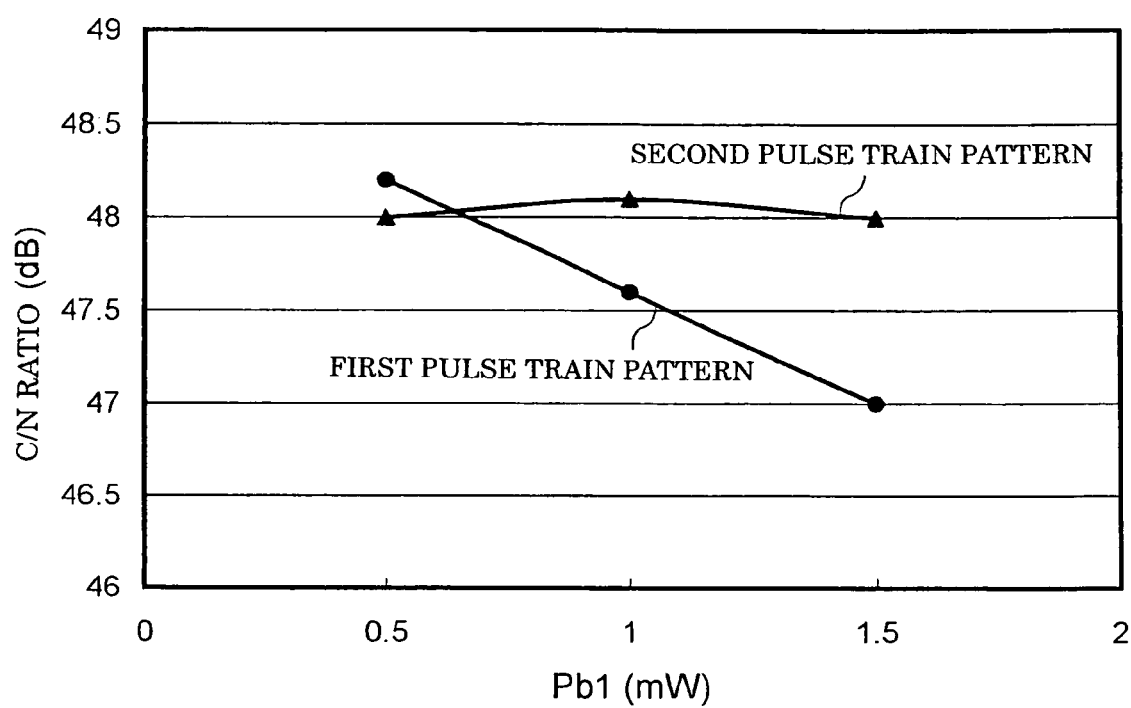

FIG. 8 is a graph showing the relationship between C/N ratio of a 2 T signal and first bottom power Pb1 in the case where data were recorded at a data transfer rate of about 35 Mbps by modulating the power of a laser beam using a first pulse train pattern having a pulse whose level was set to a level corresponding to the optimum recording power Pw and the relationship between C/N ratio of a 2 T signal and first bottom power Pb1 in the case where data were recorded at a data transfer rate of about 35 Mbps by modulating the power of a laser beam using a second pulse train pattern having a pulse whose level was set to a level corresponding to the optimum recording power Pw.

Figure 9:
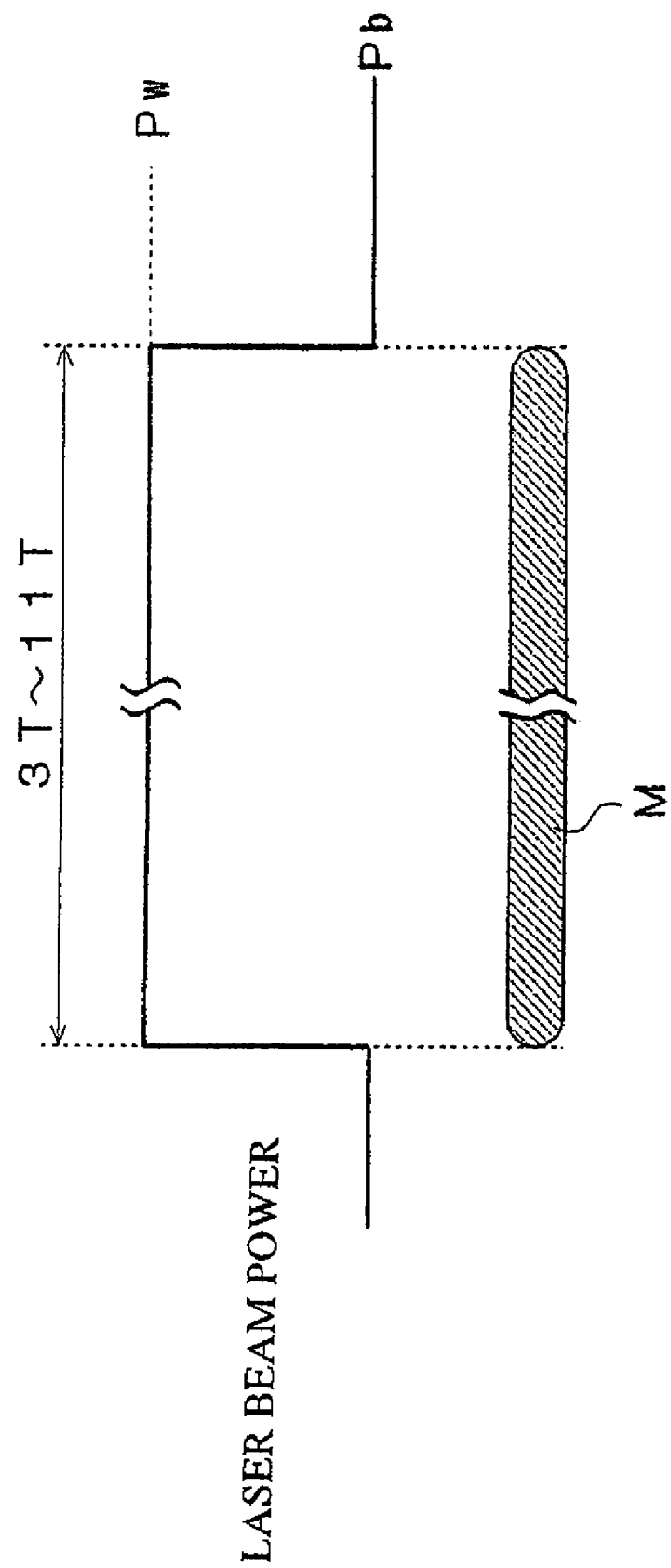

FIG. 9 is a diagram showing a typical pulse train pattern used for recording data in a CD-R including a recording layer containing an organic dye.

Figure 10:
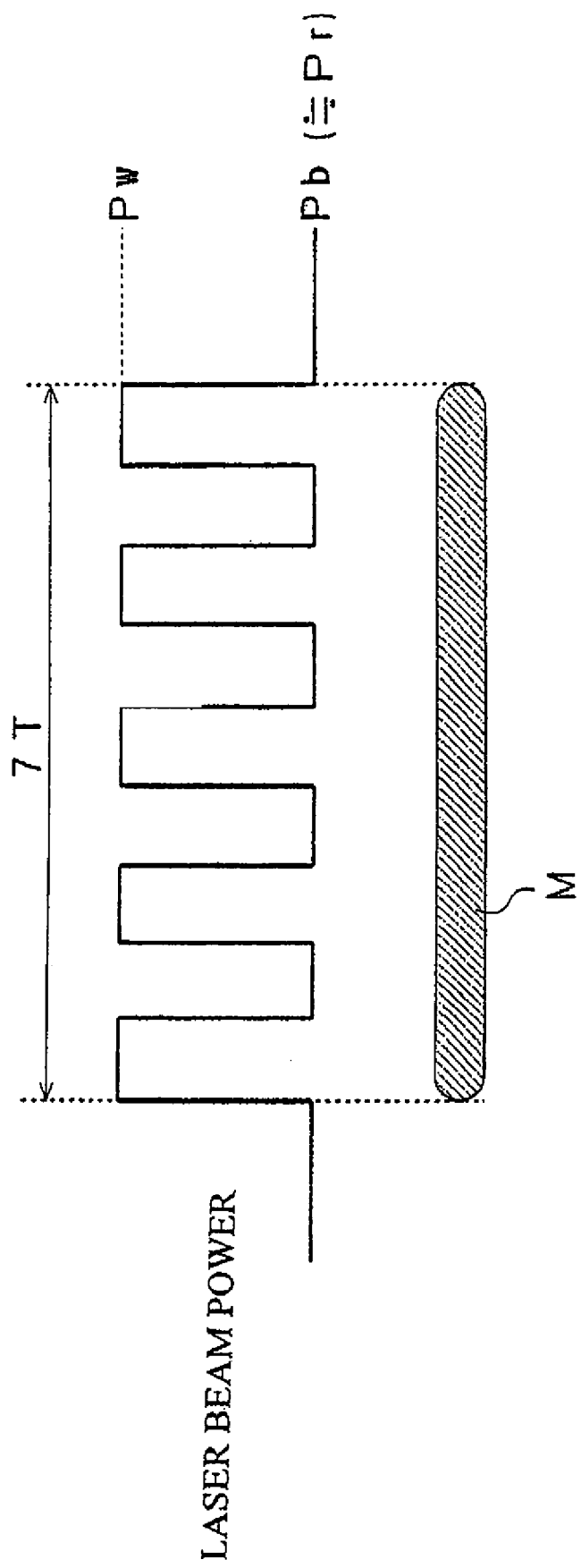

FIG. 10 is a diagram showing a typical pulse train pattern (basic pulse train pattern) used for recording data in a DVD-R including a recording layer containing an organic dye.

DESCRIPTION OF THE INVENTION

Preferred embodiments of the present invention will now be described with reference to accompanying drawings.

Figure 1:
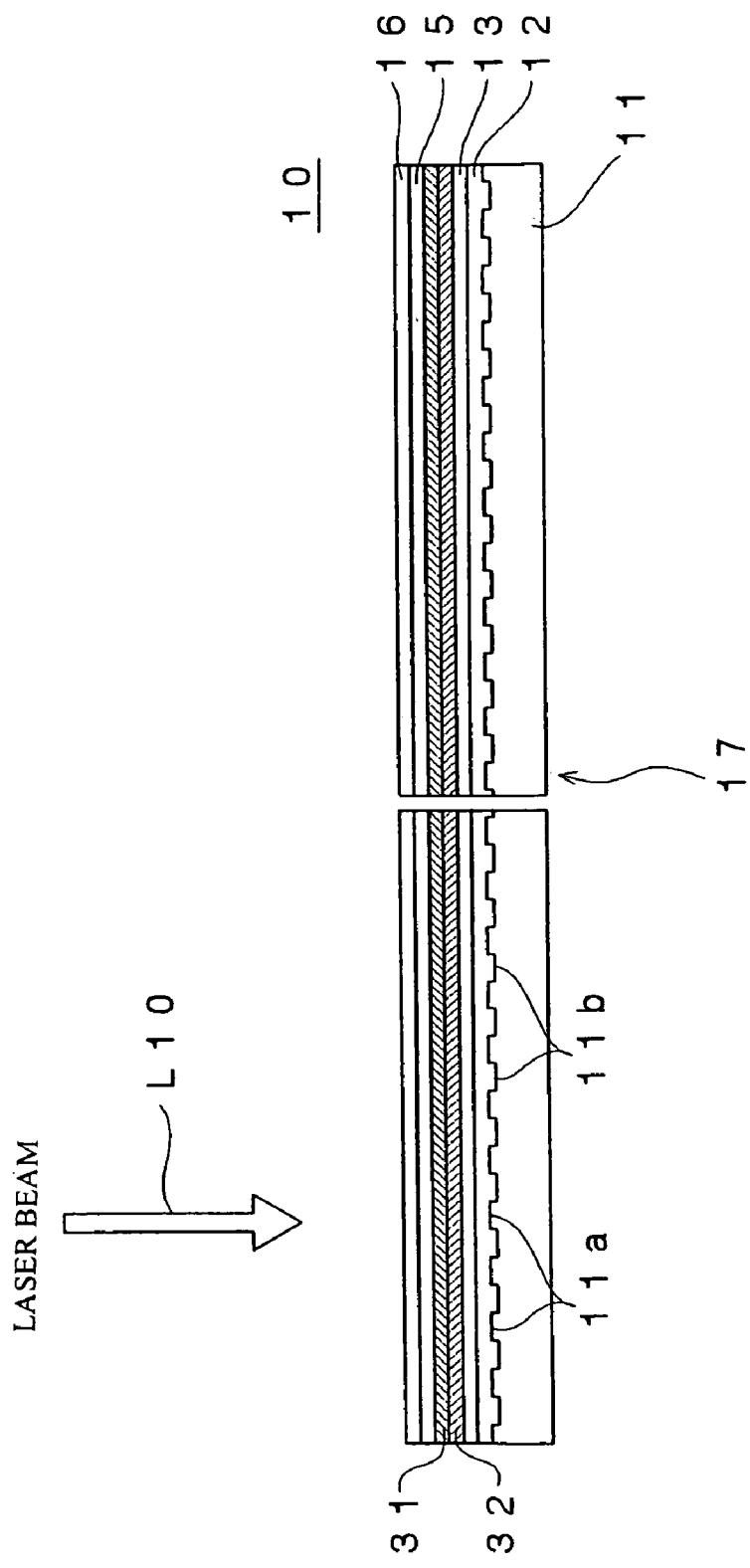
FIG. 1 is a schematic cross-sectional view showing the structure of an optical recording medium that is a preferred embodiment of the present invention.

FIG. 1 is a schematic cross-sectional view showing the structure of an optical recording medium that is a preferred embodiment of the present invention.

As shown in FIG. 1, the optical recording medium 10 according to this embodiment is constituted as a write-once type optical recording medium and includes a substrate 11, a reflective layer 12 formed on the surface of the substrate 11, a second dielectric layer 13 formed on the surface of the reflective layer 12, a second recording layer 32 formed on the surface of the second dielectric layer 13, a first recording layer 31 formed on the surface of the second recording layer 32, a first dielectric layer 15 formed on the surface of the first recording layer 31 and a light transmission layer 16 formed on the surface of the first dielectric layer 15.

As shown in FIG. 1, a center hole is formed at a center portion of the optical recording medium 10.

In this embodiment, as shown in FIG. 1, a laser beam L10 is projected onto the surface of the light transmission layer 16, thereby recording data in the optical recording medium 10 or reproducing data from the optical recording medium 10.

The substrate 11 serves as a support for ensuring mechanical strength required for the optical recording medium 10.

The material used to form the substrate 11 is not particularly limited insofar as the substrate 11 can serve as the support of the optical recording medium 10. The substrate 11 can be formed of glass, ceramic, resin or the like. Among these, resin is preferably used for forming the substrate 11 since resin can be easily shaped. Illustrative examples of resins suitable for forming the substrate 40 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 11 from the viewpoint of easy processing, optical characteristics and the like.

In this embodiment, the substrate 11 has a thickness of about 1.1 mm.

The shape of the substrate 11 is not particularly limited but is normally disk-like, card-like or sheet-like.

As shown in FIG. 1, grooves 11a and lands 11b are alternately formed on the surface of the substrate 11. The grooves 11a and/or lands 11b serve as a guide track for the laser beam L10 when data are to be recorded or when data are to be reproduced.

The reflective layer 12 serves to reflect the laser beam L10 entering through the light transmission layer 16 so as to emit it from the light transmission layer 16.

The thickness of the reflective layer 12 is not particularly limited but is preferably from 10 nm to 300 nm, more preferably from 20 nm to 200 nm.

The material used to form the reflective layer 12 is not particularly limited insofar as it can reflect a laser beam, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflectivity, such as Al, Au, Ag, Cu or alloy containing at least one of these metals, such as alloy of Al and Ti.

The reflective layer 12 is provided in order to increase the difference in reflection coefficient between a recorded region and an unrecorded region by a multiple interference effect when the laser beam L10 is used to optically reproduce data from the first recording layer 31 and the second recording layer 32, thereby obtaining a higher reproduced signal (C/N ratio).

The first dielectric layer 15 and the second dielectric layer 13 serve to protect the first recording layer 31 and the second recording layer 32. Degradation of optically recorded data can be prevented over a long period by the first dielectric layer 15 and the second dielectric layer 13. Further, since the second dielectric layer 13 also serves to prevent the substrate 11 and the like from being deformed by heat, it is possible to effectively prevent jitter and the like from becoming worse due to the deformation of the substrate 11 and the like.

The dielectric material used to form the first dielectric layer 15 and the second dielectric layer 13 is not particularly limited insofar as it is transparent and the first dielectric layer 15 and the second dielectric layer 13 can be formed of a dielectric material containing oxide, sulfide, nitride or a combination thereof, for example, as a primary component. More specifically, in order to prevent the substrate 11 and the like from being deformed by heat and thus protect the first recording layer 31 and the second recording layer 32, it is preferable for the first dielectric layer 15 and the second dielectric layer 13 to contain at least one kind of dielectric material selected from the group consisting of $Al_2O_3$, AlN, ZnO, ZnS, GeN, GeCrN, CeO, SiO, $SiO_2$, SiN and SiC as a primary component and it is more preferable for the first dielectric layer 15 and the second dielectric layer 13 to contain $ZnS.SiO_2$ as a primary component.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

In this specification, the statement that a dielectric layer contains a certain dielectric material as a primary component means that the dielectric material is maximum among dielectric materials contained in the dielectric layer. $ZnS.SiO_2$ means a mixture of ZnS and $SiO_2$.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the optical recording medium 10 owing to stress present in the first dielectric layers 15 and/or the second dielectric layer 13.

The first recording layer 31 and the second recording layer 32 are adapted for recording data therein. In this embodiment, the first recording layer 31 is disposed on the side of the light transmission layer 16 and the second recording layer 32 is disposed on the side of the substrate 11.

In this embodiment, the first recording layer 31 contains an element selected from the group consisting of Si, Ge, Sn, Mg, In, Zn, Bi and Al as a primary component and the second recording layer 32 contains Cu as a primary component.

It is possible to improve the long term storage reliability of an optical recording medium 10 by proving the first recording layer 31 containing an element selected from the group consisting of Si, Ge, Sn, Mg, In, Zn, Bi and Al as a primary component and the second recording layer 32 containing Cu as a primary component in this manner.

Further, these elements apply only light load to the environment and there is no risk of the global atmosphere being damaged.

In order to thoroughly improve the C/N ratio of the reproduced signal, it is particularly preferable for the first recording layer 31 to contain an element selected from the group consisting of Ge, Si, Mg, Al and Sn as a primary component and is particularly preferable for the to contain Si as a primary component.

Cu contained in the second recording layer 32 as a primary component quickly mixes with the element contained in the first recording layer 31 when irradiated with a laser beam L10, thereby enabling data to be quickly recorded in the first recording layer 31 and the second recording layer 32.

In order to improve the recording sensitivity of the first recording layer 31, it is preferable for the first recording layer 31 to be added with at least one kind of an element selected from the group consisting of Mg, Al, Cu, Ag and Au.

In order to improve the storage reliability and the recording sensitivity of the second recording layer 32, it is preferable for the second recording layer 32 to be added with at least one kind of an element selected from the group consisting of Al, Si, Zn, Mg, Au, Sn, Ge, Ag, P, Cr, Fe and Ti.

The total thickness of the first recording layer 31 and the second recording layer 32 is not particularly limited but the surface smoothness of the first recording layer 31 irradiated with the laser beam L10 becomes worse as the total thickness of the first recording layer 31 and the second recording layer 32 becomes thicker. As a result, the noise level of the reproduced signal becomes higher and the recording sensitivity is lowered. On the other hand, in the case where the total thickness of the first recording layer 31 and the second recording layer 32 is too small, the change in reflection coefficient between before and after irradiation with the laser beam L10 is small, so that a reproduced signal having high strength (C/N ratio) cannot be obtained. Moreover, it becomes difficult to control the thickness of the first recording layer 31 and the second recording layer 32.

Therefore, in this embodiment, the first recording layer 31 and the second recording layer 32 are formed so that the total thickness thereof is from 2 nm to 40 nm. In order to obtain a reproduced signal having higher strength (C/N ratio) and further decrease the noise level of the reproduced signal, the total thickness of the first recording layer 31 and the second recording layer 32 is preferably from 2 nm to 20 nm and more preferably 2 nm to 10 nm.

The individual thicknesses of the first recording layer 31 and the second recording layer 32 are not particularly limited but in order to considerably improve the recording sensitivity and greatly increase the change in reflection coefficient between before and after irradiation with the laser beam L10, the thickness of the first recording layer 31 is preferably from 1 nm to 30 nm and the thickness of the second recording layer 32 is preferably from 1 nm to 30 nm. Further, it is preferable to define the ratio of the thickness of the first recording layer 31 to the thickness of the second recording layer 32 (thickness of first recording layer 31/thickness of second recording layer 32) to be from 0.2 to 5.0.

The light transmission layer 16 serves to transmit a laser beam L10 and preferably has a thickness of 10 μm to 300 μm. More preferably, the light transmission layer 16 has a thickness of 50 μm to 150 μm.

The material used to form the light transmission layer 16 is not particularly limited but in the case where the light transmission layer 16 is to be formed by the spin coating process or the like, ultraviolet ray curable resin, electron beam curable resin or the like is preferably used. More preferably, the light transmission layer 16 is formed of ultraviolet ray curable resin.

The light transmission layer 16 may be formed by adhering a sheet made of light transmittable resin to the surface of the first dielectric layer 15 using an adhesive agent.

The optical recording medium 10 having the above-described configuration can, for example, be fabricated in the following manner.

The reflective layer 12 is first formed on the surface of the substrate 11 formed with the grooves 11a and lands 11b.

The reflective layer 12 can be formed by a gas phase growth process using chemical species containing elements for forming the reflective layer 12. Illustrative examples of the gas phase growth processes include vacuum deposition process, sputtering process and the like.

The second dielectric layer 13 is then formed on surface of the reflective layer 12.

The second dielectric layer 13 can be also formed by a gas phase growth process using chemical species containing elements for forming the second dielectric layer 13. Illustrative examples of the gas phase growth processes include vacuum deposition process, sputtering process and the like.

The second recording layer 32 is further formed on the second dielectric layer 13. The second recording layer 32 can be also formed by a gas phase growth process using chemical species containing elements for forming the second recording layer 32.

The first recording layer 31 is then formed on the second recording layer 32. The first recording layer 31 can be also formed by a gas phase growth process using chemical species containing elements for forming the first recording layer 31.

The first dielectric layer 15 is then formed on the first recording layer 31. The first dielectric layer 15 can be also formed by a gas phase growth process using chemical species containing elements for forming the first dielectric layer 15.

Finally, the light transmission layer 16 is formed on the first dielectric layer 15. The light transmission layer 16 can be formed, for example, by applying an acrylic ultraviolet ray curable resin or epoxy ultraviolet ray curable resin adjusted to an appropriate viscosity onto the surface of the second dielectric layer 15 by spin coating to form a coating layer and irradiating the coating layer with ultraviolet rays to cure the coating layer.

Thus, the optical recording medium 10 was fabricated.

Data are recorded in the optical recording medium 10 of the above-described configuration, in the following manner, for example.

Figure 2:
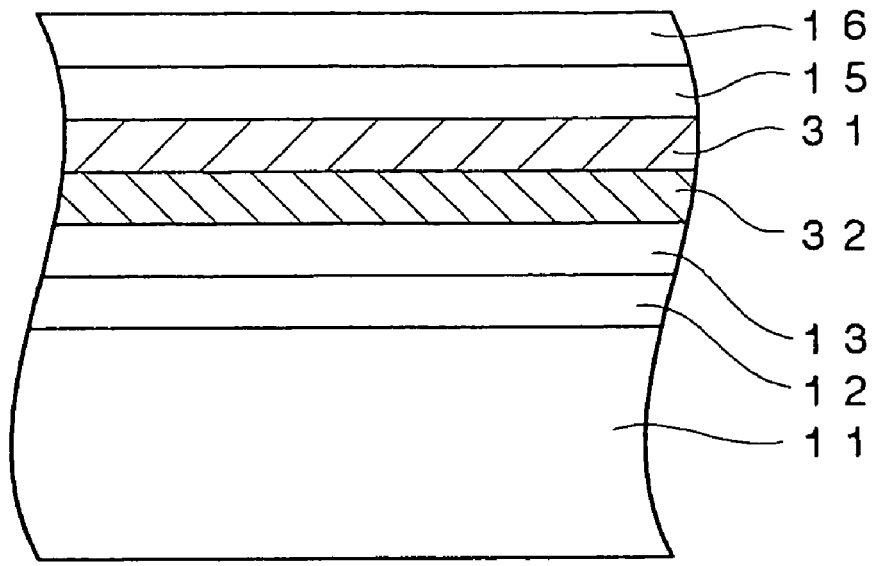
FIG. 2(a) is a schematic enlarged cross-sectional view of the optical recording medium shown in FIG. 1 and FIG. 2(b)
Figure 2:
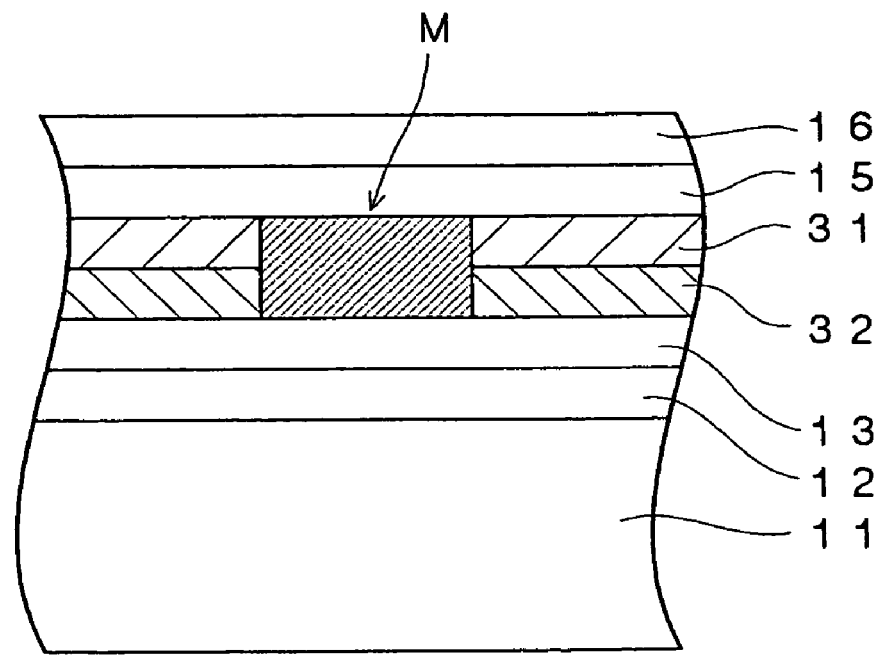

As shown in FIGS. 1 and 2(a), the first recording layer 31 and the second recording layer 32 are first irradiated via the light transmission layer 16 with a laser beam L10 having predetermined power.

In order to record data with high recording density, it is preferable to project a laser beam L10 having a wavelength λ of 450 nm or shorter onto the optical recording medium 10 via an objective lens (not shown) having a numerical aperture NA of 0.7 or more and it is more preferable that λ/NA be equal to or smaller than 640 nm. In such a case, the spot diameter of the laser beam L10 on the surface of the first recording layer 31 becomes equal to or smaller than 0.65 μm.

In this embodiment, a laser beam L10 having a wavelength λ of 405 nm is condensed onto the optical recording medium 10 via an objective lens having a numerical aperture NA of 0.85 so that the spot diameter of the laser beam L10 on the surface of the first recording layer 31 becomes about 0.43 μm.

As a result, the element contained in the first recording layer 31 as a primary component and the element contained in the second recording layer 32 as a primary component mix with each other and as shown in FIG. 2(b), a recording mark M composed of a mixture of the primary component element of the first recording layer 31 and the primary component element of the second recording layer 32 is formed.

When the primary component elements of the first recording layers 31 and 32 are mixed, the reflection coefficient of the region markedly changes. Since the reflection coefficient of the thus formed recording mark M is therefore greatly different from that of the region surrounding the mixed region M, it is possible to obtain a high reproduced signal (C/N ratio) when optically recorded information is reproduced.

When the laser beam L10 is projected, the first recording layer 31 and the second recording layer 32 are heated by the laser beam L10. In this embodiment, however, the first dielectric layer 15 and the second dielectric layer 13 are disposed outward of the first recording layer 31 and the second recording layer 32. Deformation of the substrate 11 and the light transmission layer 16 by heat is therefore effectively prevented.

FIG. 3 is a set of diagrams showing a first pulse train pattern in the case where the 1.7RLL Modulation Code is employed, wherein FIG. 3(a) shows a pulse train pattern when a 2 T signal is recorded and FIG. 3(b) shows a pulse train pattern when one of a 3 T signal to an 8 T signal is recorded.

The first pulse train pattern is a pattern for modulating the power of a laser beam L10 suitable for the case of forming a recording mark M using a lower recording power Pw and is preferably employed in the case of increasing the linear recording velocity to or higher than 5 m/sec and recording data at a high data transfer rate.

As shown in FIGS. 3(a) and 3(b), in the first pulse train pattern, a recording pulse for forming a recording mark M is divided into (n−1) divided pulses and the power of a laser beam L10 is set to a recording power Pw at the peak of each of the divided pulses and set to a first bottom power Pb1 higher than a reproducing power Pr of a laser beam L10 used for reproducing data at other portions of the pulse. More specifically, the first pulse train pattern is constituted by increasing the bottom power Pb in the basic pulse train pattern shown in FIG. 10 from a level substantially equal to the reproducing power Pr to the first bottom power Pb1 higher than the reproducing power Pr.

The recording power Pw is set to a high level such that the element contained in the first recording layer 31 as a primary component and the element contained in the second recording layer 32 as a primary component can be heated and mixed to form a record mark M when a laser beam having the recording power Pw is projected onto the optical recording medium 10. On the other hand, the first bottom power Pb1 is set to a low level such that it is higher than the reproducing power Pr but the element contained in the first recording layer 31 as a primary component and the element contained in the second recording layer 32 as a primary component cannot substantially be mixed when a laser beam having the first bottom power Pb1 is projected onto the optical recording medium 10.

It is preferable for the ratio Pb1/Pw of the first bottom power Pb1 to the recording power Pw to be 0.1 to 0.5, and when data are to be recorded at a linear recording velocity equal to or higher than 10 m/sec, it is preferable for the ratio Pb1/Pw of the first bottom power Pb1 to the recording power Pw to be 0.2 to 0.5 and is more preferable for it to be 0.3 to 0.45.

In the case where it is assumed that the ratio Pb1/Pw of the first bottom power Pb1 to the recording power Pw when data are to be recorded at a linear velocity VL is AL and the ratio Pb1/Pw of the first bottom power Pb1 to the recording power Pw when data are to be recorded at a linear velocity VH is AH, it is preferable to set the first bottom power Pb1 and the recording power Pw so that AH is larger than AL, is more preferable to set it so that AH is larger than 1.5 * AL and smaller than 5.0 * AL and is most preferable to set it so that AH is larger than 2.5 * AL and smaller than 4.0 * AL.

In the case where the first pulse train pattern is constituted in this manner, the heating of a region where a recording mark M is to be formed by a laser beam whose power is set to the recording power Pw is augmented by a laser beam whose power is set to the first bottom power Pb1, thereby facilitating the formation of a recording mark M. On the other hand, the element contained in the first recording layer 31 as a primary component and the element contained in the second recording layer 32 as a primary component are prevented from mixing with each other at a blank region between neighboring recording marks M and forming a recording mark M.

Therefore, in the case where the power of a laser beam L10 is modulated using the first pulse train pattern, thereby recording data in the optical recording medium 10, a recording mark M can be formed using a laser beam L10 having a lower recording power Pw and it is therefore possible to achieve a high transfer rate by increasing the linear recording velocity to or higher than 5 m/sec.

FIG. 4 is a set of diagrams showing a first pulse train pattern in the case where the 1.7RLL Modulation Code is employed, wherein FIG. 4(a) shows a pulse train pattern when a 2 T signal is recorded and FIG. 4(b) shows a pulse train pattern when one of a 3 T signal to an 8 T signal is recorded.

The second pulse train pattern is a pattern for modulating a laser beam L10 which is suitable for forming a recording mark M by a laser beam L10 having a lower recording power Pw and is preferably selected in the case where it is necessary to cool a downstream edge portion of a recording mark M with respect to the moving direction of a laser beam L10 (hereinafter referred to as "a rear edge portion of a recording mark").

As shown in FIGS. 4(a) and 4(b), in the second pulse train pattern, a recording pulse for forming a recording mark M is divided into (n−1) divided pulses and the power of a laser beam L10 is set to a recording power Pw at the peak of each of the divided pulses, set to a second bottom power Pb2 immediately before a first divided pulse and set to a first bottom power Pb1 at other portions of the pulse. As shown in FIG. 4, the first bottom power Pb1 and the second bottom power Pb2 are determined so that the first bottom power Pb1 is higher than the second bottom power Pb2 and the second bottom power Pb2 is determined to be substantially equal to a reproducing power Pr or close thereto.

Therefore, the second pulse train pattern is constituted by inserting a cooling interval Tcl at which the power of a laser beam L10 is set to the second bottom power Pb2 into a portion immediately after a last divided pulse in the basic pulse train pattern shown in FIG. 10 and increasing the bottom power Pb in the basic pulse train pattern shown in FIG. 10 to the first bottom power Pb1 substantially equal to or higher than the reproducing power Pr.

In the second pulse train pattern, the recording power Pw is set to a high level at which the element contained in the first recording layer 31 as a primary component and the element contained in the second recording layer 32 as a primary component can be heated and mixed to form a record mark M when a laser beam having the recording power Pw is projected onto the optical recording medium 10. On the other hand, the first bottom power Pb1 is set to a low level such that it is higher than the reproducing power Pr but the element contained in the first recording layer 31 as a primary component and the element contained in the second recording layer 32 as a primary component cannot substantially be mixed when a laser beam having the first bottom power Pb1 is projected onto the optical recording medium 10.

The ratio Pb1/Pw of the first bottom power Pb1 to the recording power Pw is set similarly in the first pulse train pattern.

In the case where the second pulse train pattern is constituted in this manner, the heating of a region where a recording mark M is to be formed by a laser beam whose power is set to the recording power Pw is augmented by a laser beam whose power is set to the first bottom power Pb1, thereby facilitating the formation of a recording mark M. On the other hand, the element contained in the first recording layer 31 as a primary component and the element contained in the second recording layer 32 as a primary component are prevented from mixing with each other at a blank region between neighboring recording marks M and forming a recording mark M.

Therefore, in the case where the power of a laser beam L10 is modulated using the second pulse train pattern, thereby recording data in the optical recording medium 10, a recording mark M can be formed using a laser beam L10 having a lower recording power Pw and it is therefore possible to achieve a high transfer rate by increasing the linear recording velocity to or higher than 5 m/sec.

Further, in the second pulse train pattern, since a cooling interval Tcl at which the power of a laser beam L10 is set to the second bottom power Pb2 is inserted into a portion immediately after a last divided pulse, the rear edge portion of a recording mark M heated by a laser beam L10 having the recording power Pw projected for forming the recording mark M can be effectively cooled, thereby preventing the element contained in the first recording layer 31 as a primary component and the element contained in the second recording layer 32 as a primary component from mixing with each other at a region downstream of the rear edge portion of the recording mark M with respect to the moving direction of the laser beam L10. It is therefore possible to effectively prevent the rear edge portion of a recording mark M from being shifted and control the length and width of a recording mark M in a desired manner.

According to this embodiment, since a recording pulse of a laser beam L10 for forming a recording mark M is divided into (n−a) divided pulses where a is 0, 1 or 2 and it is preferable to set a to 2 in the 8/16 Modulation Code and set a to 1 in 1,7 RLL Modulation Code and the first bottom power Pb1 and the second bottom power Pb2 are determined so that the ratio Pb1/Pb2 of the first bottom power Pb1 to the second bottom power Pb2 is 0.1 to 0.5, data can be recorded in the optical recording medium 10 using a laser beam L10 having a low recording power Pw. It is therefore possible to employ a relatively inexpensive semiconductor laser beam having a low output even in the case data are to be recorded at a linear recording velocity equal to or higher than 5 m/sec.

FIG. 5 is a block diagram showing a data recording apparatus that is a preferred embodiment of the present invention.

As shown in FIG. 5, a data recording apparatus 100 includes a spindle motor 52 for rotating the optical recording medium 10, a head 53 for projecting a laser beam onto the optical recording medium 10 and receiving the light reflected by the optical recording medium 10, a controller 54 for controlling the operation of the spindle motor 52 and the head 53, a laser drive circuit 55 for feeding a laser drive signal to the head 53, and a lens drive circuit 56 for feeding a lens drive signal to the optical head 53.

As shown in FIG. 5, the controller 54 includes a focus servo tracking circuit 57, a tracking servo circuit 58 and a laser control circuit 59.

When the focus servo tracking circuit 57 is activated, a laser beam L10 is focused onto the first recording layer 51 of the rotating optical recording medium 10 and when the tracking servo circuit 58 is activated, the spot of the laser beam L10 automatically follows the track of the optical recording medium 10.

As shown in FIG. 5, each of the focus servo tracking circuit 57 and the tracking servo circuit 58 has an auto-gain control function for automatically adjusting the focus gain and an auto-gain control function for automatically adjusting the tracking gain.

Further, the laser control circuit 59 is adapted to generate a laser drive signal to be supplied by the laser drive circuit 55.

In this embodiment, data for identifying the above described first pulse train pattern or the second pulse train pattern are recorded in the optical recording medium 10 together with data for identifying various recording conditions, such as a linear recording velocity necessary for recording data, as data for setting recording conditions in the form of wobbles or pre-pits.

Therefore, the laser control circuit 59 reads data for setting recording conditions recorded in the optical recording medium 10 prior to recording data in the optical recording medium 10, selects the first pulse train pattern or the second pulse train pattern based on the thus read data for setting recording conditions to generate a laser drive signal and causes the laser drive circuit 55 to output it to the head 53.

Thus, data are recorded in the optical recording medium 10 in accordance with the desired recording strategy.

According to this embodiment, the optical recording medium 10 is recorded with data for identifying the first pulse train pattern or the second pulse train pattern together with data for identifying various recording conditions, such as a linear recording velocity necessary for recording data, as data for setting recording conditions and prior to recording data in the optical recording medium 10, the laser control circuit 59 reads data for setting recording conditions recorded in the optical recording medium 10, selects the first pulse train pattern or the second pulse train pattern based on the thus read data for setting recording conditions to generate a laser drive signal and control the head 53 for projecting a laser beam onto the optical recording medium 10. Therefore, it is possible to record data in accordance with the desired recording strategy.

WORKING EXAMPLES AND A COMPARATIVE EXAMPLE

Hereinafter, working examples and a comparative example will be set out in order to further clarify the advantages of the present invention.

Fabrication an Optical Recording Medium

An optical recording medium having the same configuration as that of the optical recording medium 1 shown in FIG. 1 was fabricated in the following manner.

A polycarbonate substrate having a thickness of 1.1 mm and a diameter of 120 mm was first set on a sputtering apparatus. Then, a reflective layer containing a mixture of Ag, Pd and Cu and having a thickness of 100 nm, a second dielectric layer containing a mixture of ZnS and $SiO_2$ and having a thickness of 30 nm, a second recording layer containing Cu as a primary component and having a thickness of 5 nm, a first recording layer containing Si as a primary component and having a thickness of 5 nm and a first dielectric layer containing the mixture of ZnS and $SiO_2$ and having a thickness of 25 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Further, the first dielectric layer was coated using the spin coating method with an acrylic ultraviolet ray curable resin to form a coating layer and the coating layer was irradiated with ultraviolet rays, thereby curing the acrylic ultraviolet ray curable resin to form a light transmission layer having a thickness of 100 μm.

Working Example 1

The thus fabricated optical recording medium was set in an optical recording medium evaluation apparatus "DDU1000" (Product Name) manufactured by Pulstec Industrial Co., Ltd. Then, a blue laser beam having a wavelength of 405 nm was employed as the laser beam for recording data and the laser beam was condensed onto the optical recording medium via the light transmission layer using an objective lens whose numerical aperture was 0.85, and data were recorded therein under the following recording signal conditions.

Modulation Code: (1.7) RLL
Channel Bit Length: 0.12 μm
Linear Recording Velocity: 5.3 m/sec
Channel Clock: 66 MHz
Recording Signal: random signal including a 2 T signal to an 8 T signal in no particular order Data were recorded by modulating a laser beam in accordance with the first pulse train pattern including (n−1) divided pulses as a recording pulse wherein n was an integer of 2 to 8, varying the first bottom power Pb1 between 0.5 mW, 1.0 mW, 1.5 mW and 2.0 Mw and varying the recording power Pw.

Under these recording conditions, the data transfer rate was about 35 Mbps when the format efficiency was 80% and the ratio of the shortest blank region interval to the linear recording velocity (shortest blank region interval/linear recording velocity) was 30.4 nsec.

Further, data recorded in the optical recording medium were reproduced using the above mentioned optical recording medium evaluation apparatus. Then, jitter of the reproduced signals was measured using an optimum recording power Pw determined as the recording power Pw when jitter was minimum and the relationship between the optimum recording power Pw and the first bottom power Pb1 was determined. When data were reproduced, a laser beam having a wavelength of 405 nm and an objective lens whose numerical aperture (NA) was 0.85 were employed.

Working Example 2

Data were recorded in the optical recording medium similarly to in Working Example 1 except that the following recording conditions were employed. Then, the optimum recording power Pw was determined as the power of a laser beam when jitter was minimum and the relationship between the optimum recording power Pw and the first bottom power Pb1 was determined.

Modulation Code: (1.7) RLL
Channel Bit Length: 0.12 μm
Linear Recording Velocity: 10.6 m/sec
Channel Clock: 132 MHz
Recording Signal: random signal including a 2 T signal to an 8 T signal in no particular order Under these recording conditions, the data transfer rate was about 70 Mbps when the format efficiency was 80% and the ratio of the shortest blank region interval to the linear recording velocity (shortest blank region interval/linear recording velocity) was 15.2 nsec.

The results of the measurement in Working Examples 1 and 2 are shown in FIG. 6.

As shown in FIG. 6, it was found that when data were recorded by modulating the power of the laser beam in accordance with the first pulse train pattern, the level of the optimum recording power Pw became lower as the first bottom power Pb1 was set to a higher level and that when the data transfer rate was about 70 Mbps, the level of the optimum recording power Pw was markedly lowered in accordance with the increase in the level of the first bottom power Pb1.

Therefore, it was found that in the case where the linear recording velocity was high and the data transfer rate was high, it was effective to record data by modulating the power of the laser beam in accordance with the first pulse train pattern.

Further, it was found that data could be recorded at different linear recording velocities by setting the first bottom power Pb1 of the laser beam to a higher level as the linear recording velocity was higher, while maintaining the recording power Pw of the laser beam at the same level or substantially the same level. More specifically, it was found that it was possible to prevent jitter from becoming worse by setting the first bottom power Pb1 and the recording power Pw of a laser beam to 0.5 mW and 4.6 mW, respectively, and recording data in the case where data were recorded at a data transfer rate of about 35 Mbps and setting the first bottom power Pb1 and the recording power Pw of a laser beam to 2.0 mW and 4.8 mW, respectively, and recording data in the case where data were recorded at a data transfer rate of about 70 Mbps, and that data could be recorded using a relatively inexpensive semiconductor laser having a maximum output of 5 mW.

Working Example 3

Data were recorded in the optical recording medium similarly to in Working Examples 1 and 2 except that the power of a laser beam was modulated in accordance with the second pulse train pattern. Then, the optimum recording power Pw was determined as the power of a laser beam when jitter was minimum and the relationship between the optimum recording power Pw and the first bottom power Pb1 was determined.

Here, the length of the cooling interval Tcl was set to 1 T and the second bottom power Pb2 was set to 0.1 mW.

The results of the measurement are shown in FIG. 7.

As shown in FIG. 7, it was found that when data were recorded by modulating the power of the laser beam in accordance with the second pulse train pattern, the level of the optimum recording power Pw became lower as the first bottom power Pb1 was set to a higher level and that when the data transfer rate was about 70 Mbps, the level of the optimum recording power Pw was markedly lowered in accordance with the increase in the level of the first bottom power Pb1.

Therefore, it was found that in the case where the linear recording velocity was high and the data transfer rate was high, it was effective to record data by modulating the power of the laser beam in accordance with the second pulse train pattern.

Further, it was found that in the case where the power of a laser beam was modulated in accordance with the second pulse train pattern and data were recorded, data could be recorded at different linear recording velocities by setting the first bottom power Pb1 of the laser beam to a higher level as the linear recording velocity was higher, while maintaining the recording power Pw of the laser beam at the same level or substantially the same level. More specifically, it was found that it was possible to prevent jitter from becoming worse by setting the first bottom power Pb1 and the recording power Pw of a laser beam to 0.5 mW and 4.6 mW, respectively, and recording data in the case where data were recorded at a data transfer rate of about 35 Mbps and setting the first bottom power Pb1 and the recording power Pw of a laser beam to 2.0 mW and 6.0 mW, respectively, and recording data in the case where data were recorded at a data transfer rate of about 70 Mbps, and that data could be recorded using a relatively inexpensive semiconductor laser having the maximum output of 6 mW.

Furthermore, as shown in FIGS. 6 and 7, it was found that the phenomenon of the optimum recording power Pw of a laser beam becoming lower as the first bottom power Pb1 was set to a higher level was more pronounced in the case of modulating the power of a laser beam in accordance with the first pulse train pattern, thereby recording data, than in the case of modulating the power of a laser beam in accordance with the second pulse train pattern, thereby recording data. It is reasonable to assume that this was because, unlike the second pulse train pattern, the first pulse train pattern did not include the cooling interval Tcl and the heating augmentation effect by the first bottom power Pb1 was higher in the case of using the first pulse train pattern than in the case of using the second pulse train pattern.

Working Example 4

The power of a laser beam was modulated in accordance with the first pulse train pattern and the second pulse train pattern and data were recorded in the optical recording medium under the same recording conditions as those in Working Example 1. Then, data recorded in the optical recording medium were reproduced and the relationship between the first bottom power Pb1 and a C/N ratio of the 2 T signal was determined.

Here, the recording power Pw of the laser beam was set to an optimum recording power Pw at which jitter was minimum, the cooling interval Tcl was set to 1 T and the second bottom power Pb2 was set to 0.1 mW.

The results of the measurement are shown in FIG. 7.

As shown in FIG. 8, it was found that in the case where the power of a laser beam was modulated in accordance with the first pulse train pattern including no cooling interval Tcl, thereby recording data, the C/N ratio of the 2 T signal decreased as the first bottom power Pb1 was increased but that in the case where the power of a laser beam was modulated in accordance with the second pulse train pattern, thereby recording data, the C/N ratio of the 2 T signal did not substantially decrease even when the first bottom power Pb1 was increased.

It is reasonable to assume that the reason for these findings is as follows. Specifically, since the cooling interval Tcl at which the power of a laser beam was set to the second bottom power Pb2 was inserted into a portion immediately after a last divided pulse in the second pulse train pattern, the rear edge portion of a recording mark M heated by a laser beam whose power was set to the recording power Pw projected for forming the recording mark M was effectively cooled and the element contained in the first recording layer as a primary component and the element contained in the second recording layer as a primary component were prevented from mixing with each other. Therefore, it was possible to effectively prevent the rear edge portion of the recording mark M from being shifted and the length of the recording mark M was controlled in a desired manner.

The present invention has thus been shown and described with reference to a specific embodiment and Working Examples. However, it should be noted that the present invention is in no way limited to the details of the described arrangements but changes and modifications may be made without departing from the scope of the appended claims.

For example, in the above described embodiment and Working Examples, although the first recording layer 31 and the second recording layer 32 are formed in contact with each other, it is not absolutely necessary to form the first recording layer 31 and the second recording layer 32 in contact with each other but it is sufficient for the second recording layer 32 to be so located in the vicinity of the first recording layer 31 as to enable formation of a mixed region including the primary component element of the first recording layer 31 and the primary component element of the second recording layer 32 when the region is irradiated with a laser beam. Further, one or more other layers such as a dielectric layer may be interposed between the first recording layer 31 and the second recording layer 32.

Further, in the above described embodiment, although the first recording layer 31 contains an element selected from the group consisting of Si, Ge, Sn, Mg, In, Zn, Bi and Al as a primary component and the second recording layer 32 contains Cu as a primary component, it is not absolutely necessary for the first recording layer 31 to contain an element selected from the group consisting of Si, Ge, Sn, Mg, In, Zn, Bi and Al as a primary component and for the second recording layer 32 to contain Cu as a primary component and the first recording layer 31 may contain an element selected from the group consisting of Si, Ge, C, Sn, Zn and Cu as a primary component and the second recording layer 32 may contain Al as a primary component. Further, the first recording layer 31 may contain an element selected from the group consisting of Si, Ge, C and Al as a primary component and the second recording layer 32 may contain Zn as a primary component. Moreover, it is sufficient for the first recording layer 31 and the second recording layer 32 to contain different elements from each other and contain an element selected from the group consisting of Al, Si, Ge, C, Sn, Au, Zn, Cu, B, Mg, Ti, Mn, Fe, Ga, Zr, Ag and Pt as a primary component.

Furthermore, in the above described embodiment and Working Examples, although the optical recording medium 10 includes the first recording layer 31 and the second recording layer 32, the optical recording medium may include one or more recording layers containing an element selected from the group consisting of Si, Ge, Sn, Mg, In, Zn, Bi and Al as a primary component or one or more recording layers containing Al as a primary element, in addition to the first recording layer 31 and the second recording layer 32.

Moreover, although the first recording layer 31 is disposed on the side of the light transmission layer 16 and the second recording layer 32 is disposed on the side of the substrate 11 in the above described embodiment and working examples, it is possible to dispose the first recording layer 31 on the side of the substrate 11 and the second recording layer 32 on the side of the light transmission layer 16.

Further, in the above described embodiment and Working Examples, the optical recording medium 10 includes the first dielectric layer 15 and the second dielectric layer 13 and the first recording layer 31 and the second recording layer 32 are disposed between the first dielectric layer 15 and the second dielectric layer 13. However, it is not absolutely necessary for the optical recording medium 10 to include the first dielectric layer 15 and the second dielectric layer 13, i.e., the optical recording medium 10 may include no dielectric layer. Further, the optical recording medium 10 may include a single dielectric layer and in such case the dielectric layer may be disposed on either the side of the substrate 11 or the side of the light transmission layer 16 with respect to the first recording layer 31 and the second recording layer 32.

Furthermore, in Working Examples, although the first recording layer 31 and the second recording layer 32 are formed so as to have the same thickness in the above described embodiment and working examples, it is not absolutely necessary to form the first recording layer 31 and the second recording layer 32 so as to have the same thickness.

Moreover, in the above described embodiment and Working Examples, although the optical recording medium 10 is provided with the reflective layer 12, if the level of reflected light in the recording mark M formed by the mixing an element contained in the first recording layer as a primary component and Zn contained in the second recording layer as a primary component and the level of reflected light in regions onto which the laser beam was not projected greatly differ from each other, the reflective layer may be omitted.

Further, in the above described embodiment, although all recording marks M are formed by modulating the power of a laser beam in accordance with the second pulse train pattern in the case where the second pulse train pattern is to be used, since it is only in the case where the length of a recording mark M is short that the width of a recording mark M becomes thin and the C/N ratio (carrier/noise ratio) of the signal is considerably lowered when the recording power Pw of the laser beam is lowered in order to prevent the rear edge portion of a recording mark M from being shifted and the recording mark M from becoming longer than a desired length, it is possible to modulate the power of the laser beam in accordance with the second pulse train pattern only in the case where a 2 T signal is to be recorded to form the shortest recording mark M and to modulate the power of a laser beam in accordance with the first pulse train pattern in the case of recording one of a 3 T signal to an 8 T signal to form a recording mark M.

Furthermore, in the embodiment shown in FIG. 6, although the data for setting recording conditions are recorded in the optical recording medium 10 in the form of wobbles or prepits, data for setting recording conditions may be recorded in the first recording layer 31 or the second recording layer 32.

Moreover, in the embodiment shown in FIG. 6, although the focus servo tracking circuit 57, the tracking servo circuit 58 and the laser control circuit 59 are incorporated into the controller 54, it is not absolutely necessary to incorporate the focus servo tracking circuit 57, the tracking servo circuit 58 and the laser control circuit 59 into the controller 54, and the focus servo tracking circuit 57, the tracking servo circuit 58 and the laser control circuit 59 may be provided separately from the controller 54. Moreover, it is alternatively possible to install software for accomplishing functions of the focus servo tracking circuit 57, the tracking servo circuit 58 and the laser control circuit 59 in the controller 54.

Further, in the above described embodiment and Working Examples, although the explanation was made as to the case where data are recorded in a next-generation type optical recording medium 10 and where it is required to employ a semiconductor laser having a high output, the case to which the present invention can be applied is not limited to the case of recording data in a next-generation type optical recording medium but the present invention can be widely applied to the case of recording data in a write-once type optical recording medium other than a next-generation type optical recording medium.

According to the present invention, it is possible to provide a method for recording data in an optical recording medium which can record data in a write-once type optical recording medium at a high linear recording velocity.

Further, according to the present invention, it is possible to provide a method for recording data in an optical recording medium which can record data in a write-once type optical recording medium using a laser beam whose recording power is set low.

Furthermore, according to the present invention, it is possible to provide a method for recording data in an optical recording medium which can record data in a write-once type optical recording medium at a high linear recording velocity using an inexpensive semiconductor laser having a low output.

Moreover, according to the present invention, it is possible to provide a method for recording data in an optical recording medium which can record data in a write-once type optical recording medium including two or more recording layers at a high linear recording velocity.

Further, according to the present invention, it is possible to provide an apparatus for recording data in an optical recording medium which can record data in a write-once type optical recording medium at a high linear recording velocity.

Furthermore, according to the present invention, it is possible to provide an apparatus for recording data in an optical recording medium which can record data in a write-once type optical recording medium using a laser beam whose recording power is set low.

Moreover, according to the present invention, it is possible to provide an apparatus for recording data in an optical recording medium which can record data in a write-once type optical recording medium at a high linear recording velocity using an inexpensive semiconductor laser having a low output.

Further, according to the present invention, it is possible to provide an apparatus for recording data in an optical recording medium which can record data in a write-once type optical recording medium including two or more recording layers at a high linear recording velocity.

Furthermore, according to the present invention, it is possible to provide an optical recording medium in which data can be recorded at a high linear recording velocity.

Moreover, according to the present invention, it is possible to provide an optical recording medium in which data can be recorded using a laser beam whose recording power is set low.

Further, according to the present invention, it is possible to provide an optical recording medium in which data can be recorded at a high linear recording velocity using an inexpensive semiconductor laser having a low output.

Furthermore, according to the present invention, it is possible to provide an optical recording medium including two or more recording layers in which data can be recorded at a high linear recording velocity.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for recording data in a write-once type optical recording medium wherein data are recorded in the write-once type optical recording medium comprising a substrate and at least one write-once type recording layer formed on the substrate by projecting a laser beam whose power is modulated by a pulse train pattern including at least a pulse whose level is set to a level corresponding to a recording power and a pulse whose level is set to a level corresponding to a first bottom power onto the at least one write-once type recording layer and forming at least two recording marks in the at least one write-once type recording layer, the method comprising:

setting a ratio Pb1/Pw of a first bottom power Pb1 to a recording power Pw to 0.1 to 0.5; and setting a ratio AH to be larger than a ratio AL where AL is a ratio of a first level of the first bottom power Pb1 to a first level of the recording power Pw when data are to be recorded onto the write-once type optical recording medium at a first linear recording velocity and AH is a ratio of a second level of the first bottom power Pb1 to a second level of the recording power Pw when data are to be recorded onto the write-once type optical recording medium at a second linear recording velocity higher than the first linear recording velocity, while maintaining the ratio Pb1/Pw to 0.1 to 0.5 for both the ratio AH and the ratio AL and the recording power Pw substantially constant.

2. The method of claim 1, wherein data are recorded at a linear recording velocity equal to or higher than 5 m/sec.

3. The method of claim 1, wherein the write-once type optical recording medium further comprises a light transmission layer, and a first recording layer and a second recording layer formed between the substrate and the light transmission layer, further comprising:

projecting the laser beam onto the first recording layer and the second recording layer, thereby mixing an element contained in the first recording layer as a primary component and an element contained in the second recording layer as a primary component.

4. The method of claim 3 wherein the second recording layer is formed so as to be in contact with the first recording layer.

5. The method of claim 1, further comprising:

setting a ratio of the shortest blank region interval to a linear recording velocity to equal to or smaller than 40 nsec.

6. The method of claim 1 wherein data are recorded at a linear recording velocity equal to or higher than 10 m/sec by setting the ratio Pb1/Pw of the second level of the first bottom power Pb1 to the second level of the recording power Pw to 0.2 to 0.5.

7. The method of claim 5, further comprising:

setting a ratio of the shortest blank region interval to a linear recording velocity equal to or smaller than 20 nsec.

8. The method of claim 6 wherein the ratio Pb1/Pw is set to 0.3 to 0.45.

9. The method of claim 1 wherein the pulse whose level is set to a level corresponding to the recording power is constituted by divided pulses of a number corresponding to a length of the recording mark.

10. The method of claim 9 wherein the pulse train pattern includes a pulse whose level is set to a level corresponding to a second bottom power lower than the first bottom power after the pulse whose level is set to a level corresponding to the recording level.

11. The method of claim 1 wherein the first linear recording velocity is set equal to or higher than 5 m/sec and the second linear recording velocity is set equal to or higher than 10 m/sec.

12. The method of claim 11 wherein the first bottom power and the recording power are set so that AH is larger than 1.5 * AL and smaller than 5.0 * AL.

13. The method of claim 12 wherein the first bottom power and the recording power are set so that AH is larger than 2.5 * AL and smaller than 4.0 * AL.

14. The method of claim 1 wherein the laser beam having a wavelength equal to or shorter than 450 nm is projected onto the write-once type optical recording medium, thereby recording data therein.

15. The method of claim 1, further comprising:
employing an objective lens and a laser beam whose numerical aperture NA and wavelength λ satisfy λ/NA ≦640 nm; and
projecting the laser beam onto the write-once type optical recording medium via the objective lens.

16. An apparatus for recording data in a write-once type optical recording medium, comprising:
a laser beam projecting means for projecting a laser beam whose power is modulated by a pulse train pattern including at least a pulse whose level is set to a level corresponding to a recording power and a pulse whose level is set to a level corresponding to a first bottom power onto the write-once type recording medium comprising a substrate and at least one write-once type recording layer formed on the substrate;
a means for modulating the power of the laser beam in accordance with the pulse train pattern in which a ratio Pb1/Pw of the first bottom power Pb1 to the recording power Pw is set to 0.1 to 0.5; and
a means for setting AH larger than AL, while holding the recording power Pw substantially constant, where AL is a ratio of a first level of the first bottom power Pb1 to a first level of the recording power Pw when data are to be recorded at a first linear recording velocity and AH is a ratio of a second level of the first bottom power Pb1 to a second level of the recording power Pw when data are to be recorded at a second linear recording velocity higher than the first linear recording velocity.

17. The apparatus of claim 16 wherein data are recorded at a linear recording velocity equal to or higher than 5 m/sec.

18. The apparatus of claim 16 wherein a ratio of the shortest blank region interval to a linear recording velocity is set equal to or smaller than 40 nsec.

19. The apparatus of claim 16 wherein a ratio of the shortest blank region interval to a linear recording velocity is set equal to or smaller than 40 nsec and at least two recording marks are formed.

20. The apparatus of claim 16 wherein data are recorded at a linear recording velocity equal to or higher than 10 m/sec by setting the ratio Pb1/Pw of the second level of the first bottom power Pb1 to the second level of the recording power Pw to 0.2 to 0.5.

21. The apparatus of claim 19 wherein the ratio of the shortest blank region interval to a linear recording velocity is set equal to or smaller than 20 nsec and at least two recording marks are formed.

22. The of claim 20 wherein the ratio Pb1/Pw is set to 0.3 to 0.45.

23. The apparatus of claim 16 wherein the pulse whose level is set to a level corresponding to the recording level is constituted by divided pulses of a number corresponding to a length of the recording mark.

24. The apparatus of claim 23 wherein the power of the laser beam is modulated in accordance with a pulse train pattern including a pulse whose level to set to a level corresponding to a second bottom power lower than the first bottom power after the pulse whose level is set to a level corresponding to the recording level.

25. The apparatus of claim 16 wherein the first linear recording velocity is set equal to or higher than 5 m/sec and the second linear recording velocity is set equal to or higher than 10 m/sec.

26. The apparatus of claim 25 wherein the first bottom power and the recording power are set so that AH is larger than 1.5 * AL and smaller than 5.0 * AL.

27. The apparatus of claim 25 wherein the first bottom power and the recording power are set so that AH is larger than 2.5 * AL and smaller than 4.0 * AL.

28. A write-once type optical recording medium comprising:
a substrate; and
at least one write-once type recording layer formed on the substrate and constituted so that data are recorded therein by projecting a laser beam whose power is modulated by a pulse train pattern including at least a pulse whose level is set to a level corresponding to a recording power and a pulse whose level is set to a level corresponding to a first bottom power thereonto and forming at least two recording marks therein,
the write-once type optical recording medium being recorded with data for setting recording conditions required for modulating the power of the laser beam in accordance with the pulse train pattern in which a ratio Pb1/Pw of the first bottom power Pb1 to the recording power Pw is set to 0.1 to 0.5 and setting the first bottom power Pb1 and the recording power Pw so that AH is larger than AL and the recording power Pw is held substantially constant, where AL is a ratio of a first level of the first bottom power Pb1 to a first level of the recording power Pw when data are to be recorded at a first linear recording velocity and AH is a ratio of a second level of the first bottom power Pb1 to a second level of the recording power Pw when data are to be recorded at a second linear recording velocity higher than the first linear recording velocity.

29. The write-once type optical recording medium of claim 28, further comprising:
light transmission layer; and
a first recording layer and a second recording layer formed between the substrate and the light transmission layer,
wherein the at least two recording marks are formed by projecting the laser beam thereonto, thereby mixing an element contained in the first recording layer as a primary component and an element contained in the second recording layer as a primary component.

30. The write-once type optical recording medium of claim 29 wherein the second recording layer is formed so as to be in contact with the first recording layer.

31. The write-once type optical recording medium of claim 29 wherein the light transmission layer is formed so as to have a thickness of 10 nm to 300 nm.

32. A method for recording data in a write-once type optical recording medium comprising:
projecting a laser beam onto the write-once type optical recording medium whose power is modulated by a pulse train pattern including at least a pulse whose level is set to a level corresponding to a recording power and a pulse whose level is set to a level corresponding to a first bottom power;
setting a ratio Pb1/Pw of a first bottom power Pb1 to a recording power Pw is set to 0.1 to 0.5; and
setting a ratio AH to be larger than a ratio AL where AL is a ratio of a first level of the first bottom power Pb1 to a first level of the recording power Pw when data are to be recorded at a first linear recording velocity and AH is a ratio of a second level of the first bottom power Pb1 to a second level of the recording power Pw when data are to be recorded at a second linear recording velocity higher than the first linear recording velocity, while maintaining the ratio Pb1/Pw to 0.1 to 0.5 for both the ratio AH and the ratio AL and maintaining the recording power Pw substantially constant.

33. The method of claim 32 wherein data are recorded at a linear recording velocity equal to or higher than 5 m/sec.

34. The method of claim 32 wherein the write-once type optical recording medium comprises a substrate, at least one write-once type recording layer formed on the substrate and a light transmission layer, the at least one write-once type recording layer including a first recording layer and a second recording layer formed between the substrate and the light transmission layer, the method farther comprising:

projecting the laser beam onto the first recording layer and the second recording layer, thereby mixing an element contained in the first recording layer as a primary component and an element contained in the second recording layer as a primary component to form the at least two recording marks.

35. The method of claim 34 wherein the second recording layer is formed so as to be in contact with the first recording layer.

36. The method of claim 32, further comprising:

setting a ratio of the shortest blank region interval to a linear recording velocity to equal to or smaller than a selected value when forming the at least two recording marks.

37. The method of claim 36 wherein the selected value is 40 nsec.

38. The method of claim 32, further comprising:

setting the ratio Pb1/Pw of the second level of the first bottom power Pb1 to the second level of the recording power Pw to 0.2 to 0.5 1 to record the data at a linear recording velocity equal to or higher than 10 m/sec.

39. The method of claim 1 wherein the first level of the recording power Pw is equal to the second level of the recording power Pw.

40. The apparatus of claim 16 wherein the first level of the recording power Pw is equal to the second level of the recording power Pw.

41. The write-once type optical recording medium of claim 28 wherein the first level of the recording power Pw is equal to the second level of the recording power Pw.

42. The method of claim 32 wherein the first level of the recording power Pw is equal to the second level of the recording power Pw.

* * * * *